(12) United States Patent
Taki

(10) Patent No.: US 6,892,262 B1
(45) Date of Patent: May 10, 2005

(54) SERIAL BUS INTERFACE DEVICE

(75) Inventor: Nobuhiro Taki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 09/714,304

(22) Filed: Nov. 17, 2000

(30) Foreign Application Priority Data

May 19, 2000 (JP) ........................................ 2000-148465

(51) Int. Cl.$^7$ ............................................ G06F 13/00
(52) U.S. Cl. .................................... 710/300; 710/305
(58) Field of Search ................................ 710/300–304, 710/100, 305; 714/39, 56

(56) References Cited

U.S. PATENT DOCUMENTS 5,724,517 A * 3/1998 Cook et al. ................. 709/227
5,923,673 A * 7/1999 Henrikson ................... 714/712
5,966,510 A * 10/1999 Carbonneau et al. ......... 714/44
6,202,103 B1 * 3/2001 Vonbank et al. .............. 710/15

\* cited by examiner

Primary Examiner—Tim Vo
(74) Attorney, Agent, or Firm—Staas & Halsey LLP

(57) ABSTRACT

Disclosed is a serial bus interface device having a physical layer circuit capable of also simulating a plurality of devices without exerting an influence on a topology when the device is connected to a serial bus such as an IEEE 1394 serial bus. When a bus analyzer of the invention is inserted between a personal computer having the ID of 1 and a digital camera having the ID of 0 in order to analyze data on the IEEE 1394 serial bus to which the personal computer and the digital camera are connected, the bus analyzer interfaces with buses without being given an ID by the physical layer circuit, and analyzes the states of the buses without changing the state of the system to be analyzed and without changing the IDs of the personal computer and the digital camera.

20 Claims, 25 Drawing Sheets

CONSTRUCTION IN WHICH BUS ANALYZER OF FIRST EMBODIMENT
IS CONNECTED TO IEEE 1394 BUS

CONSTRUCTION IN WHICH CONVENTIONAL BUS ANALYZER IS CONNECTED TO IEEE 1394 BUS TO WHICH A NUMBER OF DEVICES ARE CONNECTED

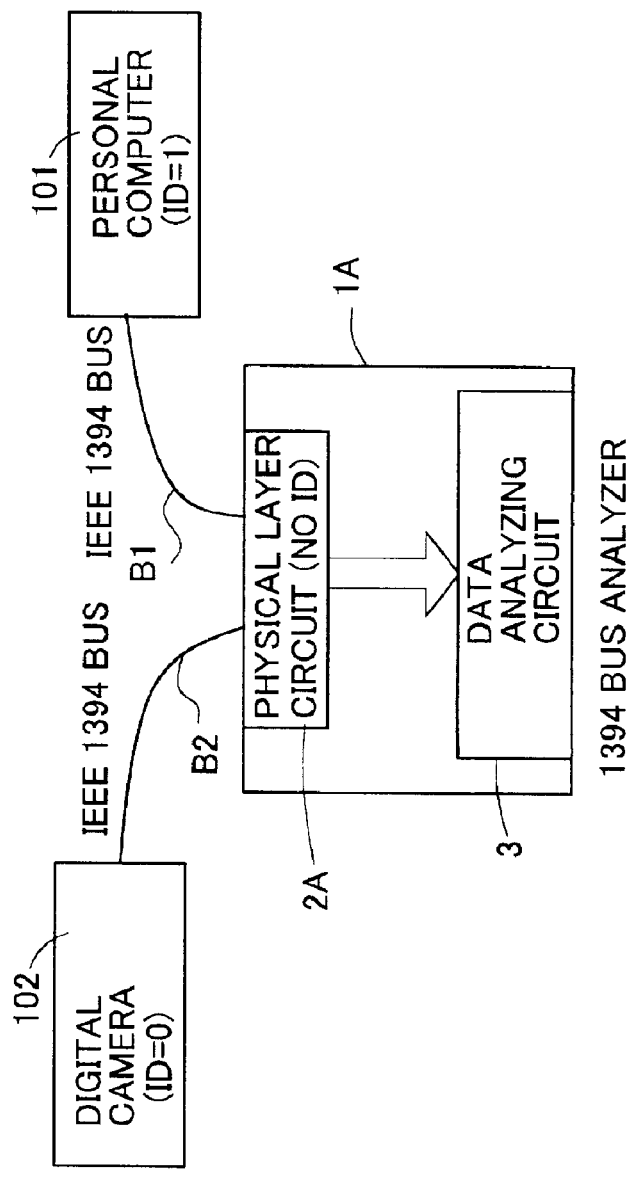
FIG. 3 CONSTRUCTION IN WHICH BUS ANALYZER OF FIRST EMBODIMENT IS CONNECTED TO IEEE 1394 BUS

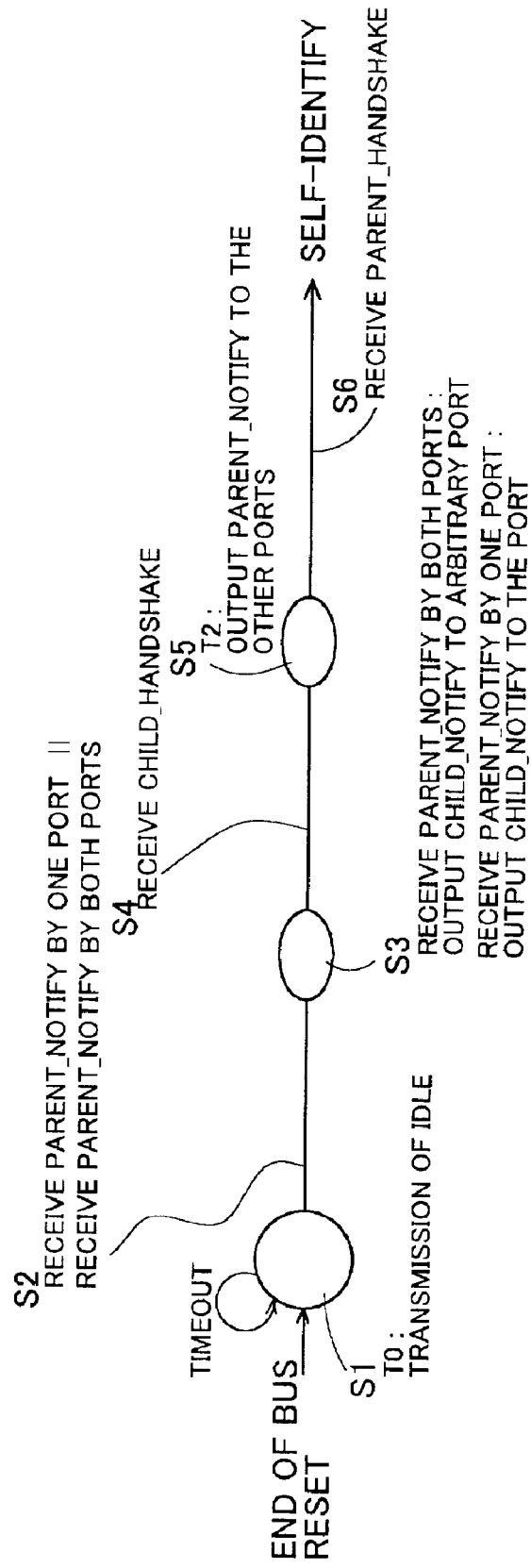

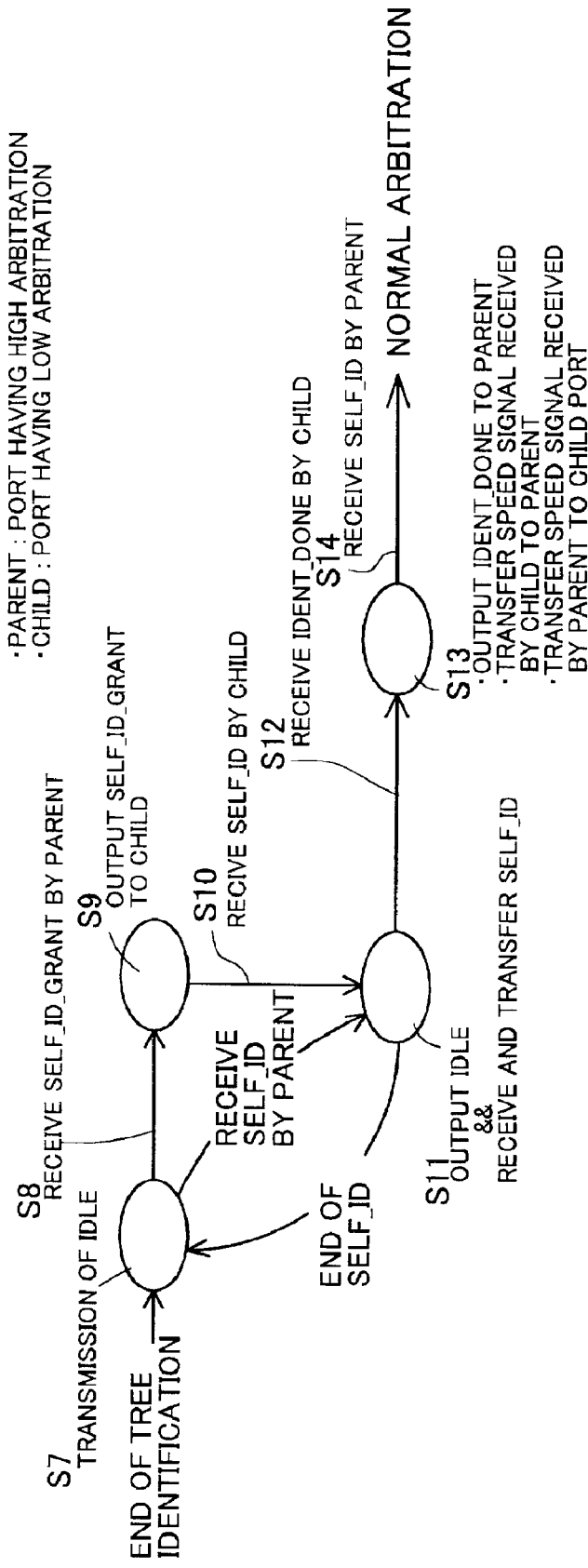
FIG. 5  STATE TRANSITION DIAGRAM SHOWING SELF-IDENTIFYING OPERATION IN FIRST EMBODIMENT

FIG. 6  TREE-IDENTIFYING OPERATION IN FIRST EMBODIMENT
(RECEIVE PARENT_NOTIFY BY ONE OF PORTS)

(P1) RECEIVE PARENT_NOTIFY FROM DIGITAL CAMERA

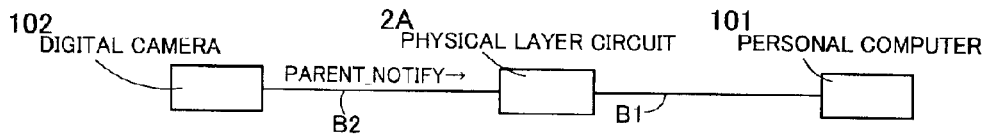

(P2) OUTPUT CHILD_NOTIFY TO DIGITAL CAMERA

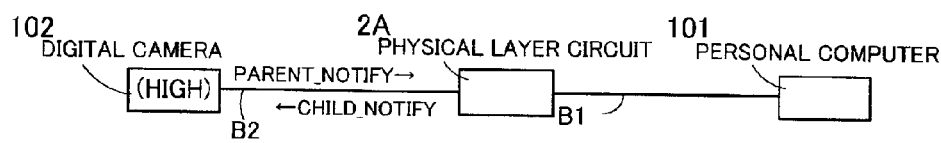

(P3) RECEIVE CHILD_HANDSHAKE BY STOPPING OUTPUT
OF PARENT_NOTIFY FROM DIGITAL CAMERA

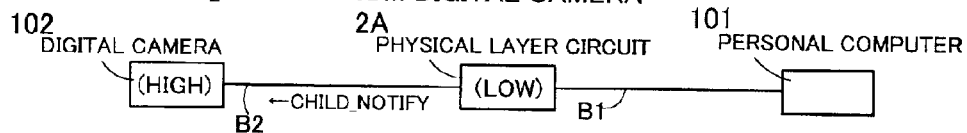

(P4) OUTPUT PARENT_NOTIFY TO THE OTHER PORT RECEIVE
ROOT_CONTENTION WHEN PERSONAL COMPUTER ALSO OUTPUTS
PARENT_NOTIFY AT THIS TIME

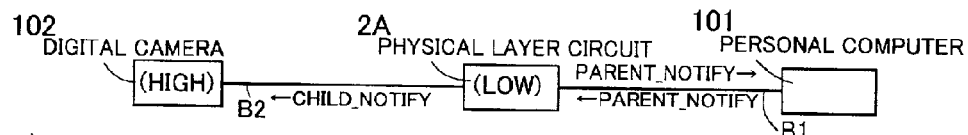

(P5) STOP OUTPUTTING PARENT_NOTIFY FROM PERSONAL COMPUTER
BUT CONTINUOUSLY OUTPUT PARENT_NOTIFY FROM PHYSICAL
LAYER CIRCUIT

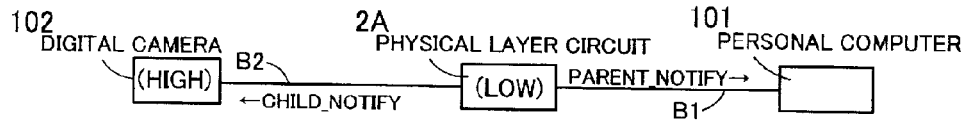

(P6) RECEIVE PARENT_HANDSHAKE WHEN PERSONAL COMPUTER
OUTPUTS CHILD_NOTIFY AFTER RANDOM TIME

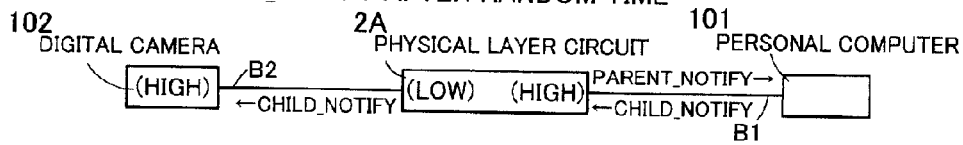

(P12) STOP OUTPUTTING SIGNALS FROM BOTH PORTS, THEREBY
FINISHING TREE-IDENTIFYING OPERATION

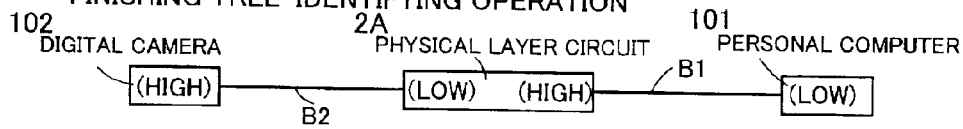

FIG. 7
TREE-IDENTIFYING OPERATION IN FIRST EMBODIMENT
(RECEIVE PARENT_NOTIFY BY BOTH PORTS)

(P7) RECEIVE PARENT_NOTIFY FROM BOTH DEVICES

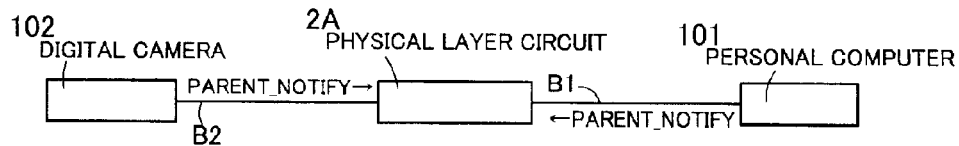

(P8) OUTPUT CHILD_NOTIFY TO DIGITAL CAMERA

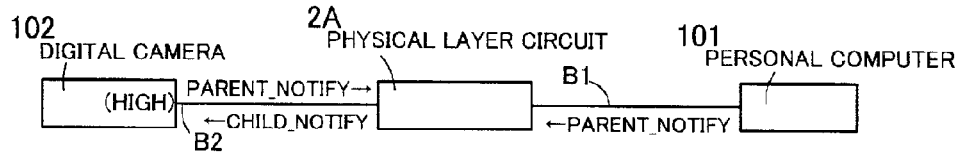

(P9) STOP OUTPUTTING PARENT_NOTIFY FROM DIGITAL CAMERA TO
THEREBY RECEIVE CHILD_HANDSHAKE, AND OUTPUT PARENT_NOTIFY
TO PERSONAL COMPUTER.
RECEIVE ROOT_CONTENTION WHEN PERSONAL COMPUTER ALSO
OUTPUTS PARENT_NOTIFY AT THIS TIME.

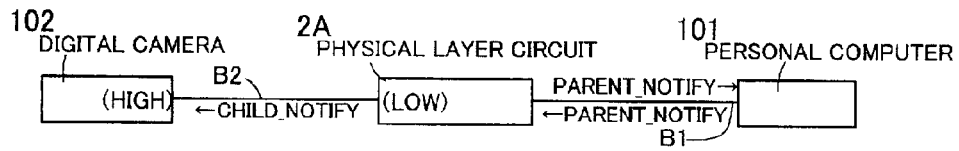

(P10) STOP OUTPUTTING PARENT_NOTIFY FROM PERSONAL COMPUTER
BUT CONTINUOUSLY OUTPUT PARENT_NOTIFY FROM PHYSICAL
LAYER CIRCUIT

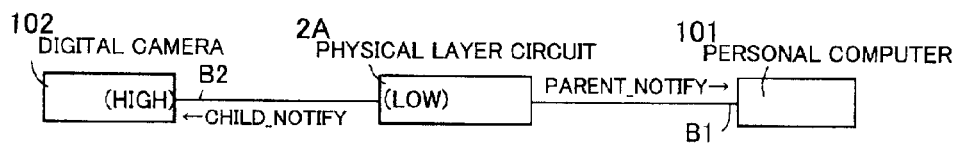

(P11) OUTPUT CHILD_NOTIFY FROM PERSONAL COMPUTER AFTER
RANDOM TIME, THEREBY RECEIVING PARENT_HANDSHAKE

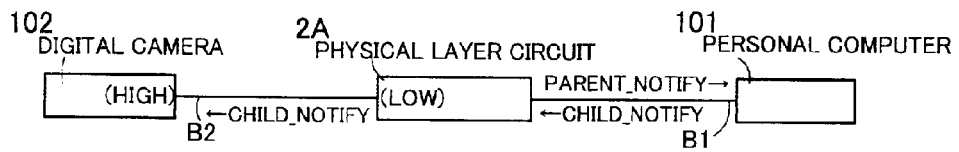

(P12) FINISH TREE-IDENTIFYING OPERATION

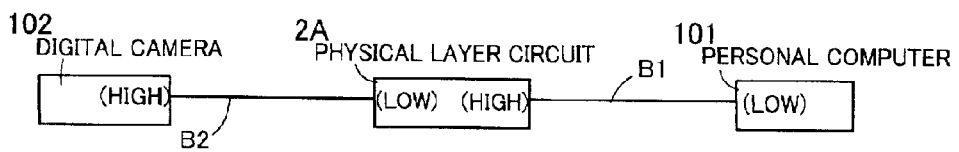

FIG. 8

SELF-IDENTIFYING OPERATION IN FIRST EMBODIMENT (P13) RECEIVE SELF_ID_GRANT FROM PERSONAL COMPUTER AND TRANSFER IT TO DIGITAL CAMERA

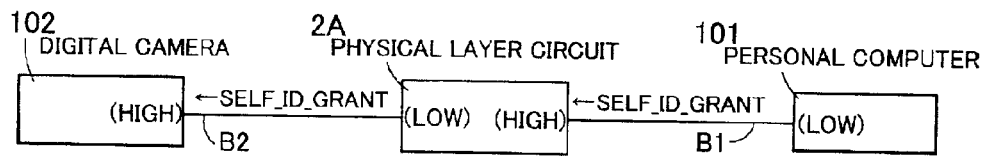

(P14) RECEIVE SELF_ID PACKET FROM DIGITAL CAMERA AND TRANSFER IT TO PERSONAL COMPUTER

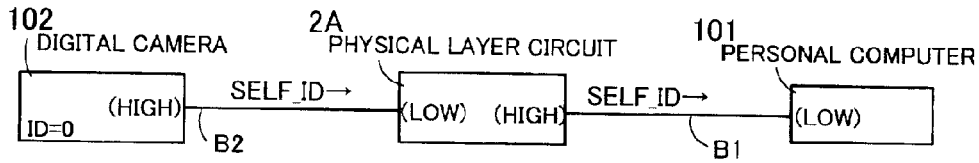

(P15) RECEIVE IDENT_DONE PACKET AND SPEED SIGNAL FROM DIGITAL CAMERA AND TRANSFER THEM TO PERSONAL COMPUTER

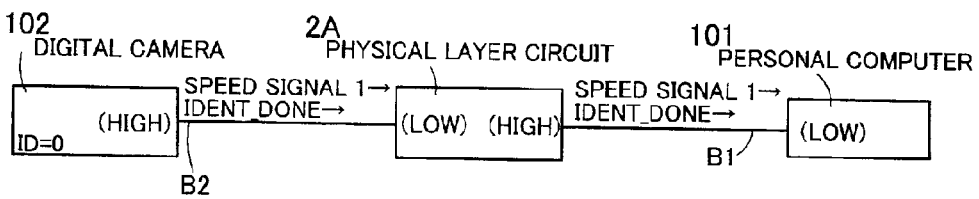

(P16) RECEIVE SPEED SIGNAL FROM PERSONAL COMPUTER AND TRANSFER IT TO DIGITAL CAMERA

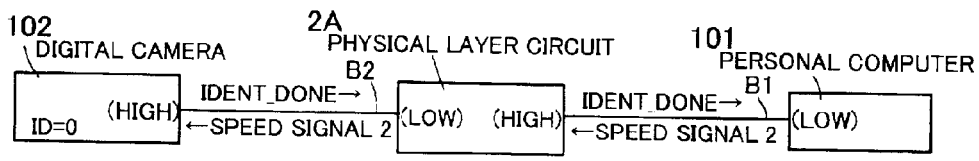

(P17) RECEIVE SELF_ID PACKET FROM PERSONAL COMPUTER AND FINISH SELF_IDENTIFYING OPERATION

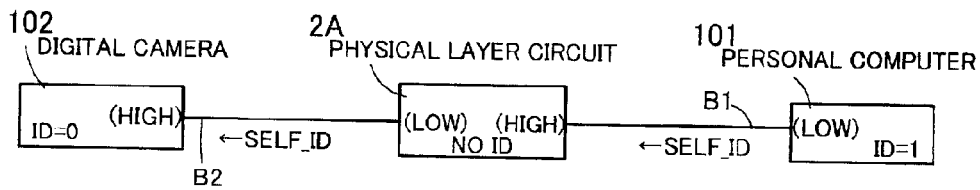

FIRST MODIFICATION OF BUS ANALYZER IN FIRST EMBODIMENT

THIRD MODIFICATION OF BUS ANALYZER IN FIRST EMBODIMENT

FOURTH MODIFICATION OF BUS ANALYZER IN FIRST EMBODIMENT

FIG. 14 SIXTH MODIFICATION OF BUS ANALYZER IN FIRST EMBODIMENT

FIRST CONSTRUCTION EXANPLE OF IEEE 1394 BUS TO WHICH BUS ANALYZER OF SECOND EMBODIMENT IS CONNECTED

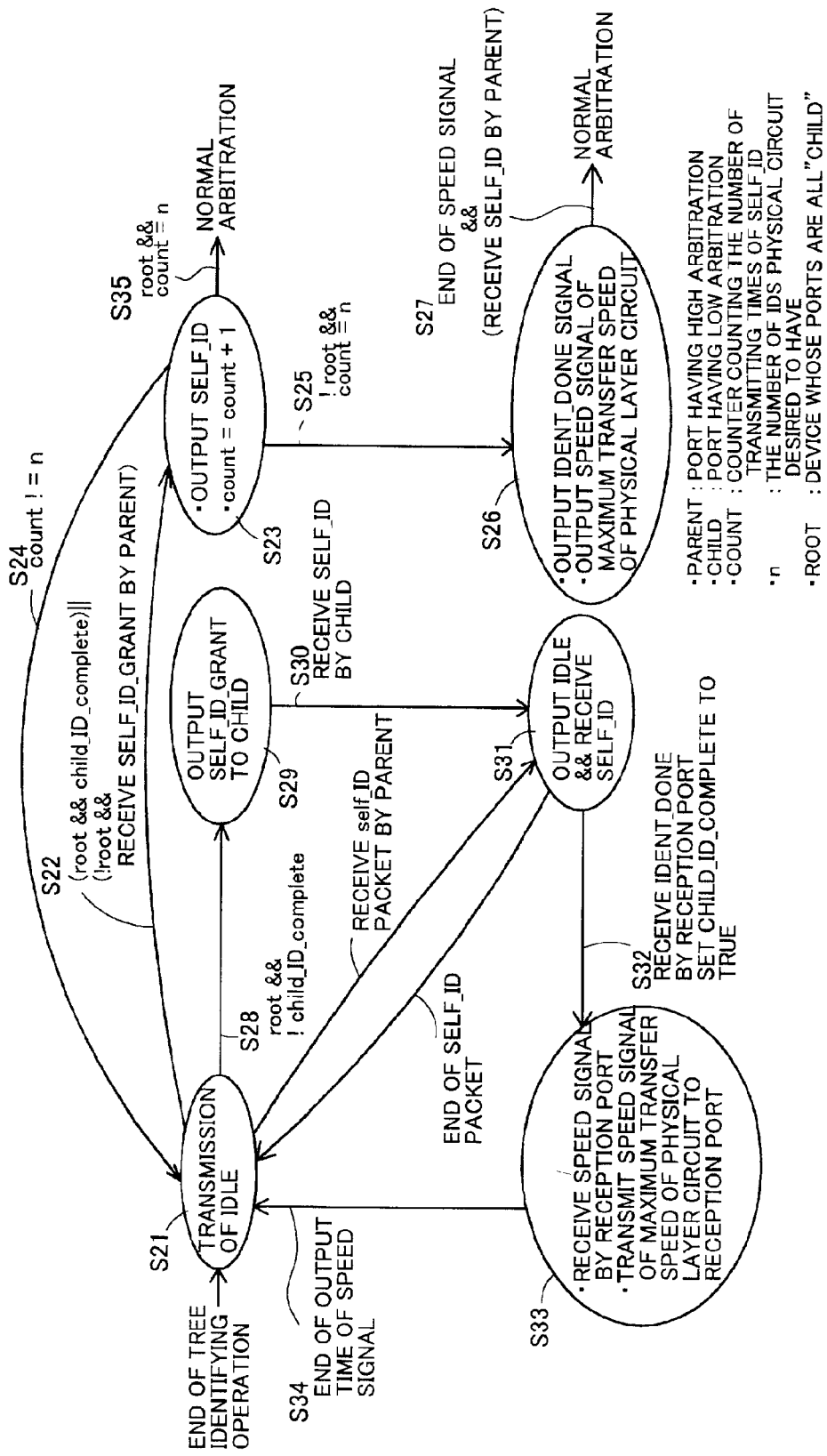
FIG. 16 STATE TRANSITION DIAGRAM SHOWING SELF-IDENTIFYING OPERATION IN FIRST CONSTRUCTION EXAMPLE OF SECOND EMBODIMENT

FIG. 17

SELF-IDENTIFYING OPERATION IN FIRST CONSTRUCTION EXAMPLE OF SECOND EMBODIMENT (IN THE CASE WHERE DEVICE CONNECTED ON THE OTHER SIDE HAS HIGH ARBITRATION)

(P21) RECEIVE SELF_ID_GRANT FROM PERSONAL COMPUTER

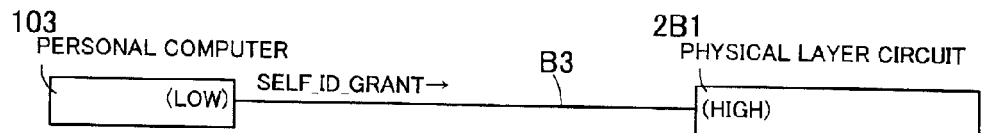

(P22) OUTPUT SELF_ID PACKET OF ID = 0 TO PERSONAL COMPUTER

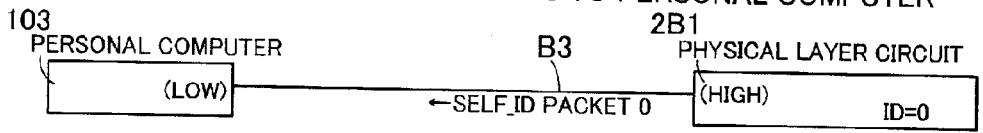

(P23) RECEIVE SELF_ID_GRANT FROM PERSONAL COMPUTER

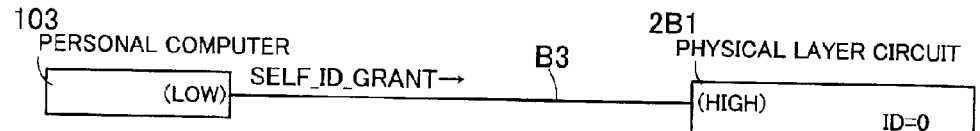

(P24) OUTPUT SELF_ID PACKET OF ID = 1 TO PERSONAL COMPUTER

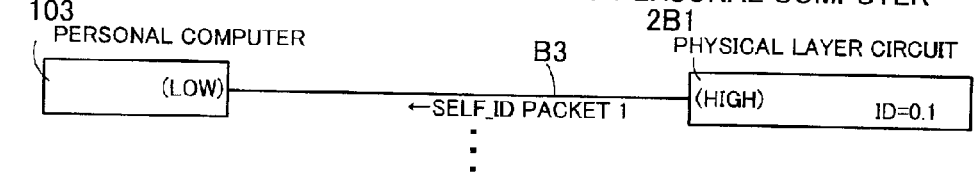

⋮

(P25) OUTPUT SELF_ID PACKET OF ID = n TO PERSONAL COMPUTER

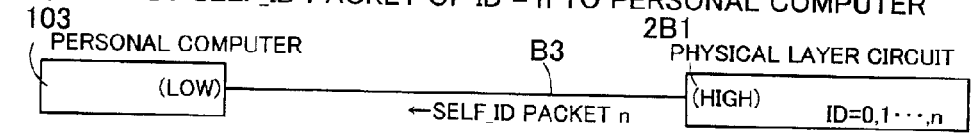

(P26) OUTPUT IDENT_DONE AND SPEED SIGNAL OF MAXIMUM TRANSFER SPEED OF PHYSICAL LAYER CIRCUIT TO PERSONAL COMPUTER AND RECEIVE SPEED SIGNAL 1 FROM PERSONAL COMPUTER

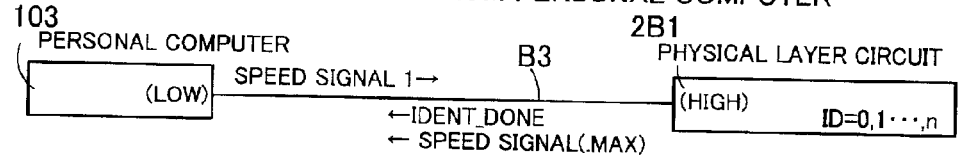

(P27) RECEIVE SELF_ID PACKET OF ID = (N+1) FROM PERSONAL COMPUTER AND FINISH SELF-IDENTIFYING OPERATION

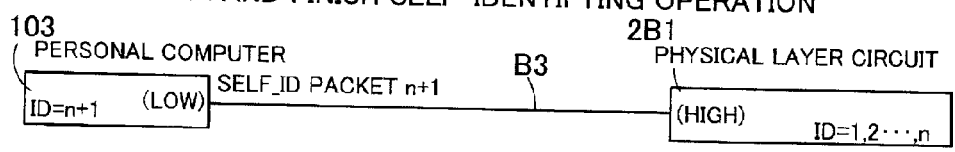

FIG. 18

SELF-IDENTIFYING OPERATION IN FIRST CONSTRUCTION EXAMPLE OF SECOND EMBODIMENT (IN THE CASE WHERE ARBITRATION OF DEVICE CONNECTED ON THE OTHER SIDE IS LOW)

(P28) OUTPUT SELF_ID_GRANT TO DIGITAL CAMERA

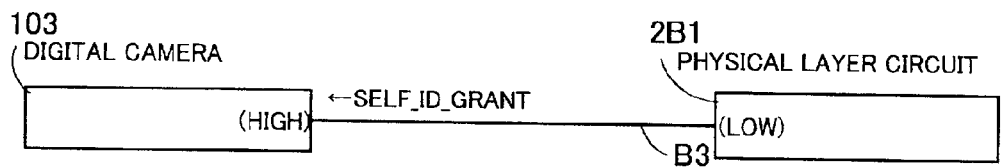

(P29) RECEIVE SELF_ID PACKET OF ID = 0 FROM DIGITAL CAMERA

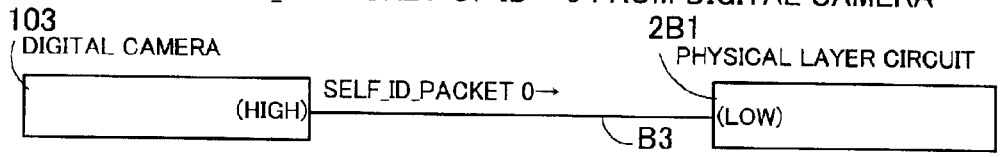

(P30) RECEIVE IDENT_DONE AND SPEED SIGNAL FROM DIGITAL CAMERA AND OUTPUT MAXIMUM SPEED SIGNAL TO DIGITAL CAMERA

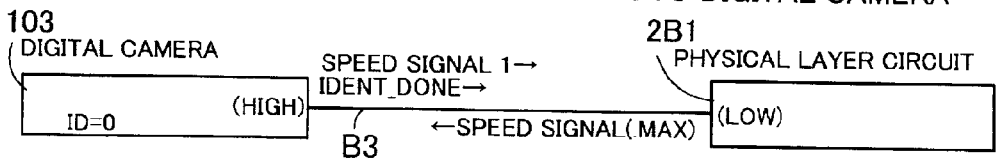

(P31) OUTPUT SELF_ID PACKET OF ID = 1 TO DIGITAL CAMERA

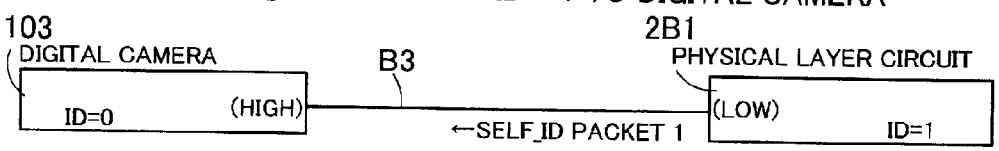

(P32) OUTPUT SELF_ID PACKET OF ID = 2 TO DIGITAL CAMERA

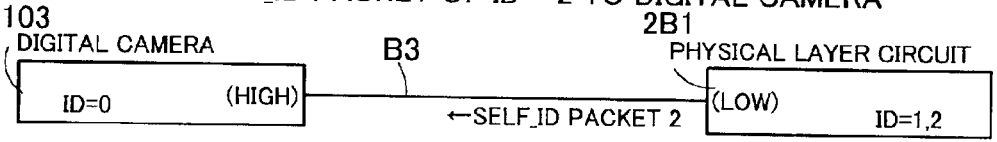

⋮

(P33) OUTPUT SELF_ID PACKET OF ID = n TO DIGITAL CAMERA

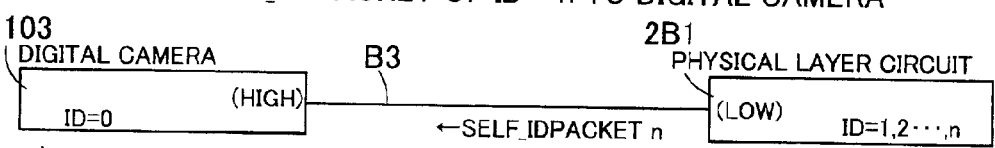

(P34) STOP OUTPUTTING SELF_ID PACKET AND FINISH SELF-IDENTIFYING OPERATION

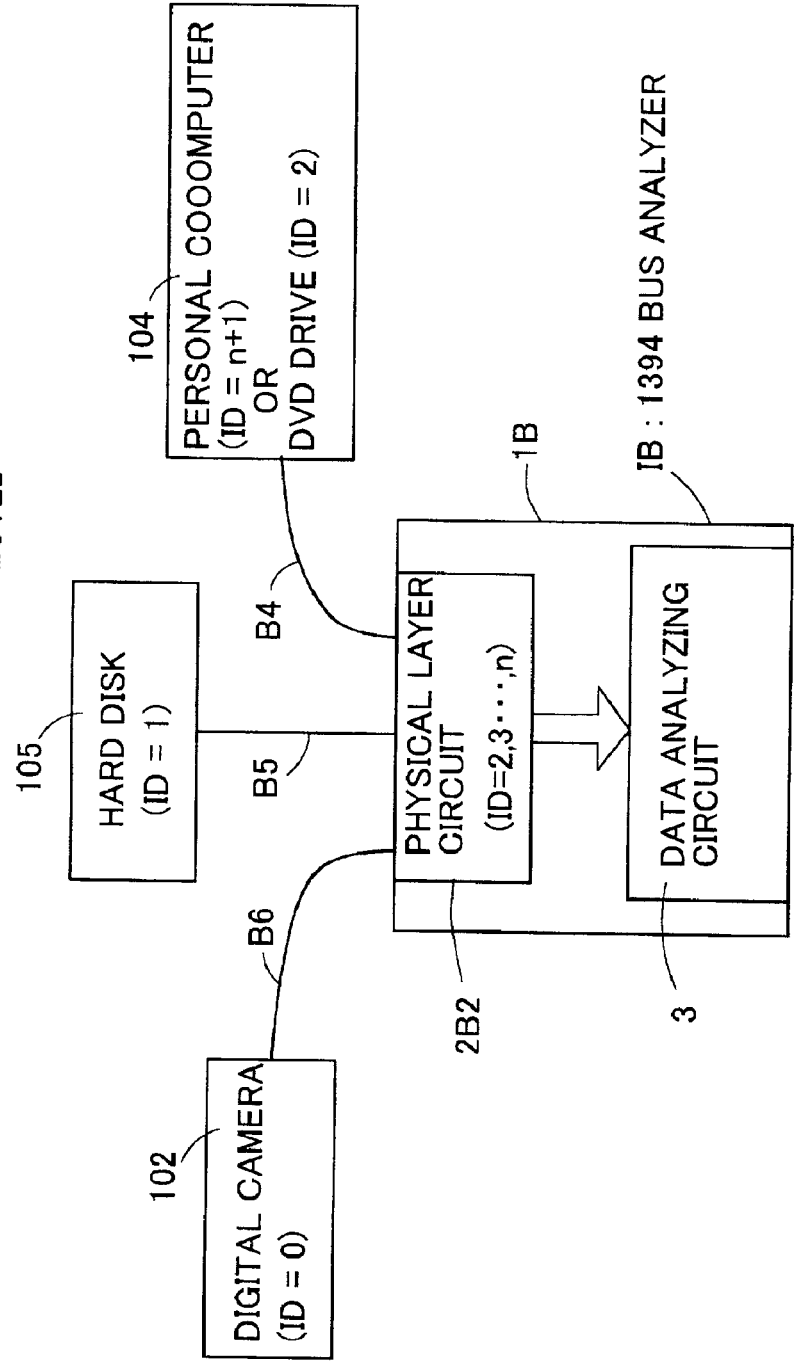
FIG. 19  SECOND CONSTRUCTION EXAMPLE OF IEEE 1394 BUS TO WHICH BUS ANALYZER OF SECOND EMBODIMENT IS CONNECTED

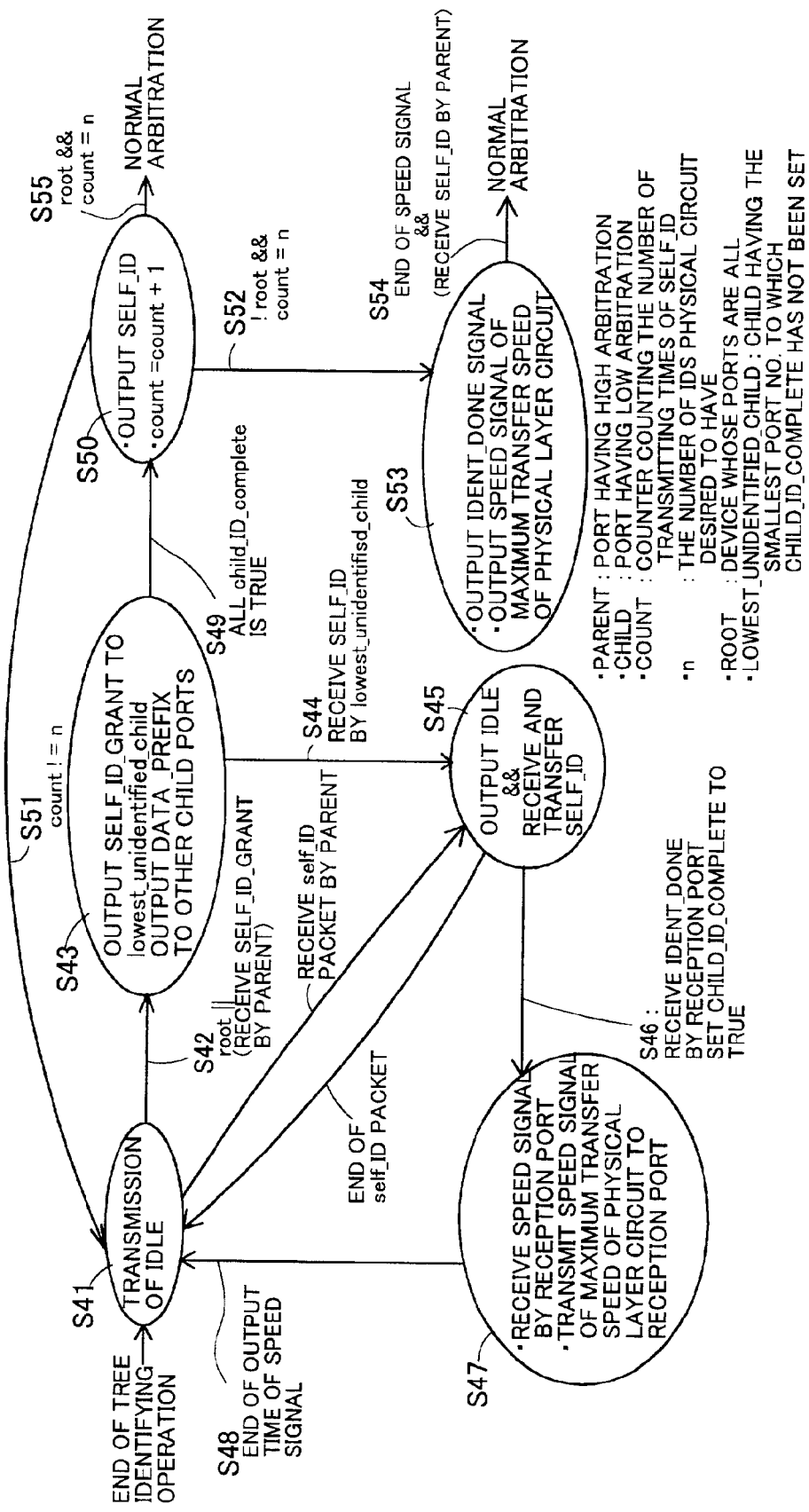
FIG. 20 STATE TRANSITION DIAGRAM SHOWING SELF-IDENTIFYING OPERATION IN SECOND CONSTRUCTION EXAMPLE OF SECOND EMBODIMENT

FIG. 21

SELF-IDENTIFYING OPERATION (1) IN SECOND CONSTRUCTION EXAMPLE OF SECOND EMBODIMENT (IN THE CASE WHERE DEVICE CONNECTED ON THE OTHER SIDE HAS DEVICE HAVING HIGH ARBITRATION)

(P41) RECEIVE SELF_ID_GRANT FROM PERSONAL COMPUTER, OUTPUT SELF_ID_GRANT TO DIGITAL CAMERA AND OUTPUT DATA_PREFIX TO HARD DISK

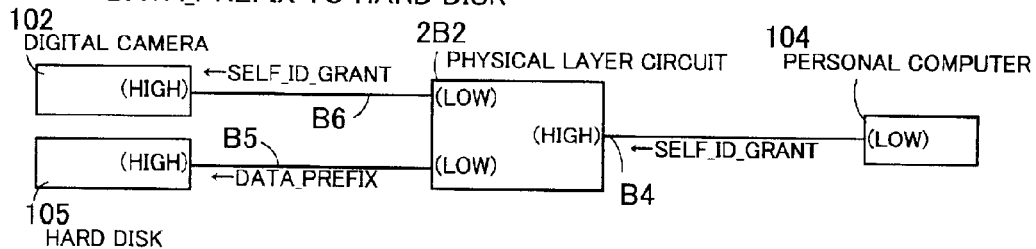

(P42) RECEIVE SELF_ID PACKET OF ID = 0 FROM DIGITAL CAMERA AND OUTPUT IT TO PERSONAL COMPUTER AND HARD DISK

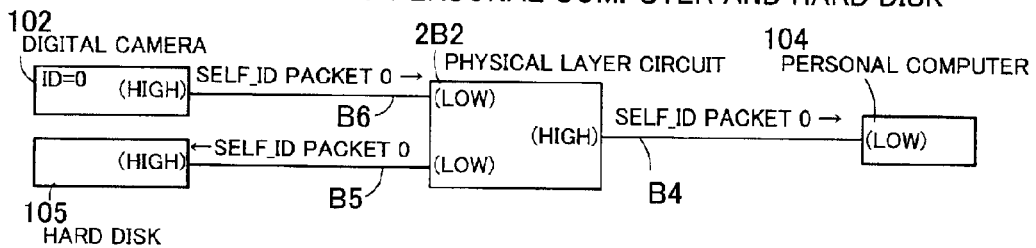

(P43) RECEIVE IDENT_DONE AND SPEED SIGNAL FROM DIGITAL CAMERA AND OUTPUT SPEED SIGNAL OF MAXIMUM TRANSFER SPEED OF PHYSICAL LAYER CIRCUIT TO DIGITAL CAMERA

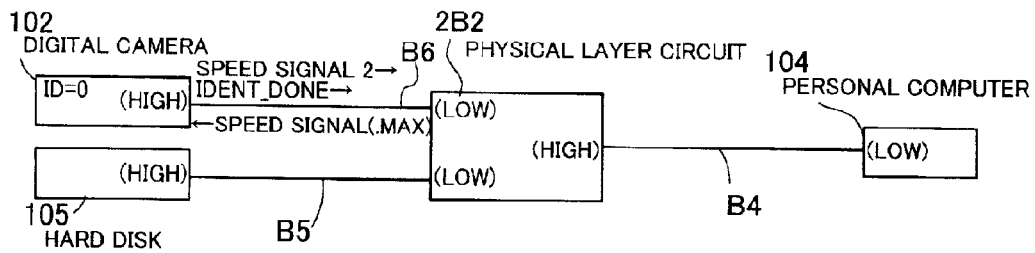

(P44) RECEIVE SELF_ID_GRANT FROM PERSONAL COMPUTER, OUTPUT SELF_ID_GRANT TO HARD DISK AND OUTPUT DATA_PREFIX TO DIGITAL CAMERA

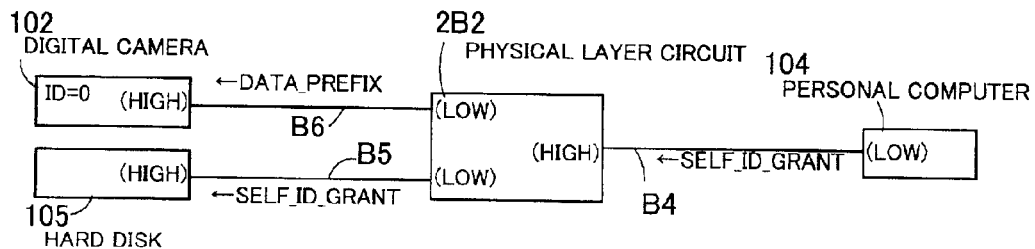

FIG. 22

SELF-IDENTIFYING OPERATION (2) IN SECOND CONSTRUCTION EXAMPLE OF SECOND EMBODIMENT (IN THE CASE WHERE DEVICE CONNECTED ON THE OTHER SIDE HAS DEVICE HAVING HIGH ARBITRATION)

(P45) RECEIVE SELF_ID PACKET OF ID = 1 FROM HARD DISK AND TRANSFER IT TO PERSONAL COMPUTER AND DIGITAL CAMERA

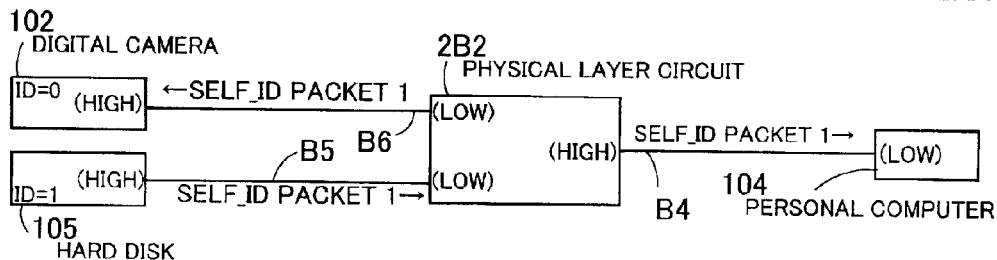

(P46) RECEIVE IDENT_DONE AND SPEED SIGNAL FROM HARD DISK AND OUTPUT SPEED SIGNAL OF MAXIMUM TRANSFER SPEED OF PHYSICAL LAYER CIRCUIT TO HARD DISK

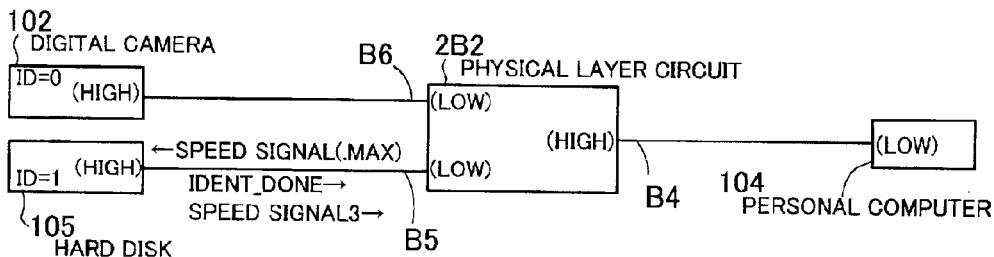

(P47) RECEIVE SELF_ID_GRANT FROM PERSONAL COMPUTER AND TRANSMIT SELF_ID PACKET OF ID = 2 TO ALL PORTS

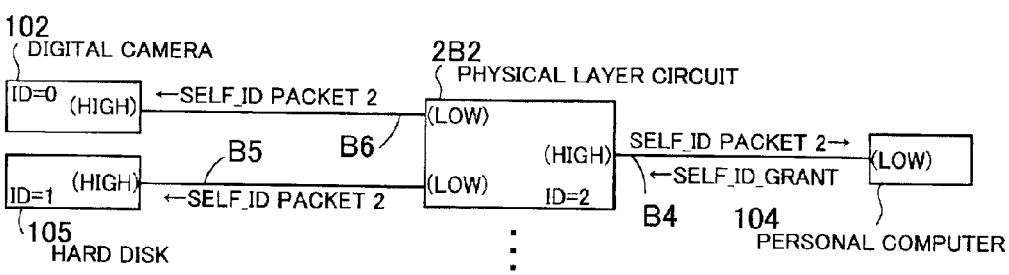

(P48) RECEIVE SELF_ID_GRANT FROM PERSONAL COMPUTER AND TRANSMIT SELF_ID PACKET OF ID = n TO ALL PORTS

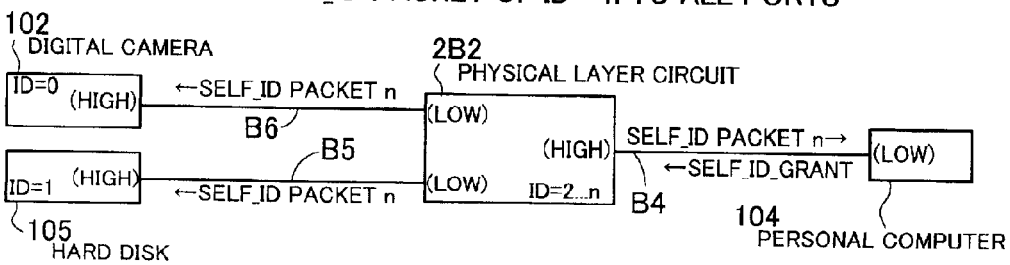

FIG. 23

SELF-IDENTIFYING OPERATION (3) IN SECOND CONSTRUCTION EXAMPLE OF SECOND EMBODIMENT (IN THE CASE WHERE DEVICE CONNECTED ON THE OTHER SIDE HAS DEVICE HAVING HIGH ARBITRATION)

(P49) OUTPUT IDENT_DONE AND SPEED SIGNAL OF MAXIMUM TRANSFER SPEED OF PHYSICAL LAYER CIRCUIT TO PERSONAL COMPUTER AFTER TRANSMITTING PACKET AND RECEIVE SPEED SIGNAL FROM PERSONAL COMPUTER

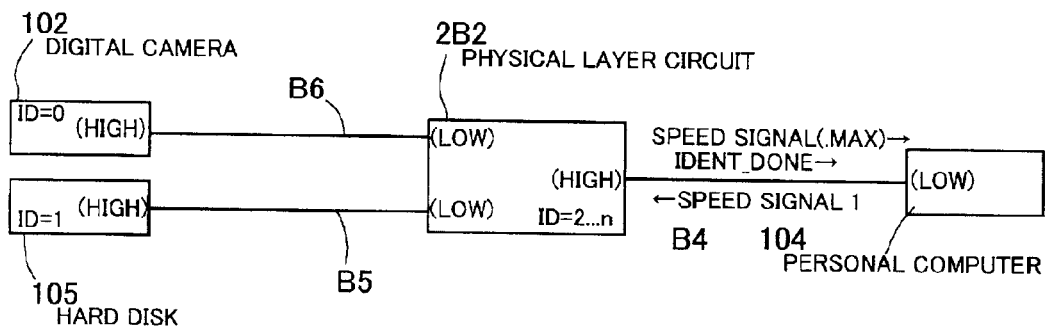

(P50) RECEIVE SELF_ID PACKET OF ID = (n+1) FROM PERSONAL COMPUTER, FINISH SELF-IDENTIFYING OPERATION AND TRANSFER PACKET TO DIGITAL CAMERA AND HARD DISK

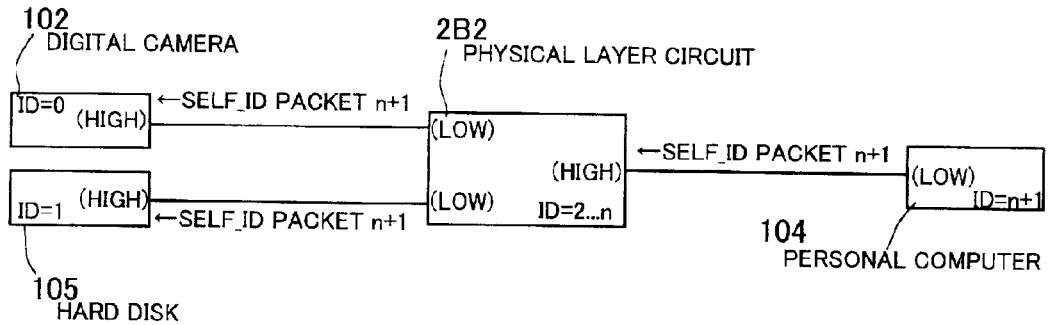

FIG. 24

SELF-IDENTIFYING OPERATION (1) IN SECOND CONSTRUCTION EXAMPLE OF SECOND EMBODIMENT (IN THE CASE WHERE DEVICE CONNECTED ON THE OTHER SIDE DOES NOT HAVE DEVICE HAVING HIGH ARBITRATION)

(P51) OUTPUT SELF_ID_GRANT TO DIGITAL CAMERA, RECEIVE SELF_ID PACKET FROM DIGITAL CAMERA, AND TRANSFER IT TO HARD DISK AND DVD DRIVE

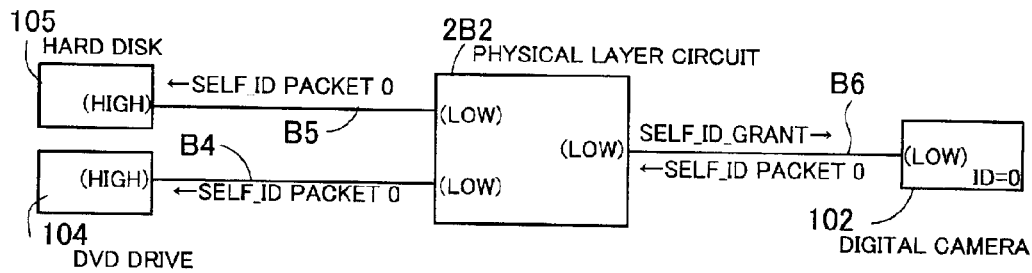

(P52) RECEIVE IDENT_DONE AND SPEED SIGNAL FROM DIGITAL CAMERA AND OUTPUT SPEED SIGNAL OF MAXIMUM TRANSFER SPEED OF PHYSICAL LAYER CIRCUIT TO DIGITAL CAMERA

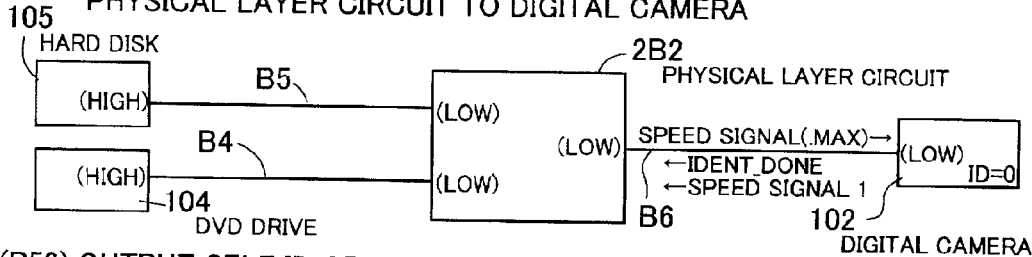

(P53) OUTPUT SELF_ID_GRANT TO HARD DISK, RECEIVE SELF_ID PACKET OF ID = 1 FROM HARD DISK, AND TRANSFER IT TO DIGITAL CAMERA AND DVD DRIVE

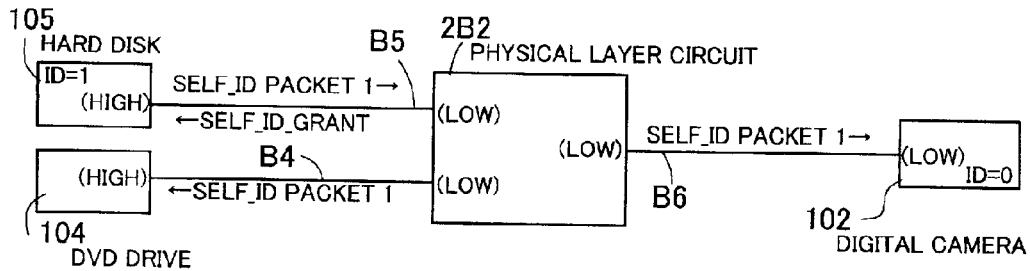

(P54) RECEIVE IDENT_DONE AND SPEED SIGNAL FROM HARD DISK AND OUTPUT SPEED SIGNAL OF MAXIMUM TRANSFER SPEED OF PHYSICAL LAYER CIRCUIT TO HARD DISK

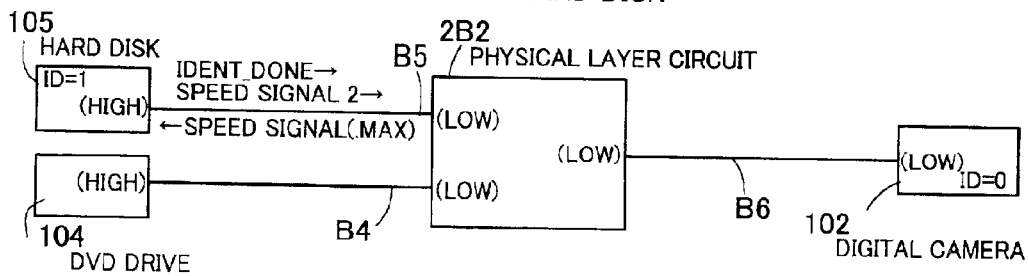

FIG. 25

SELF-IDENTIFYING OPERATION (2) IN SECOND CONSTRUCTION EXAMPLE OF SECOND EMBODIMENT (IN THE CASE WHERE DEVICE CONNECTED ON THE OTHER SIDE DOES NOT HAVE DEVICE HAVING HIGH ARBITRATION)

(P55) OUTPUT SELF_ID GRANT TO DVD, RECEIVE SELF_ID PACKET FROM DVD DRIVE, AND TRANSFER IT TO DIGITAL CAMERA AND HARD DISK

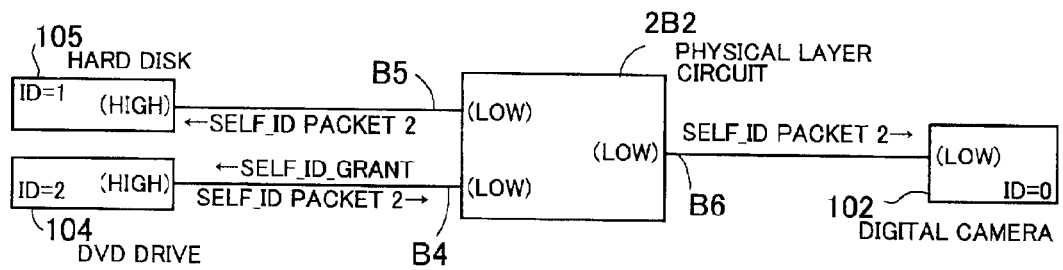

(P56) RECEIVE IDENT_DONE AND SPEED SIGNAL FROM DVD DRIVE AND OUTPUT SPEED SIGNAL OF MAXIMUM TRANSFER SPEED OF PHYSICAL LAYER CIRCUIT TO DVD DRIVE

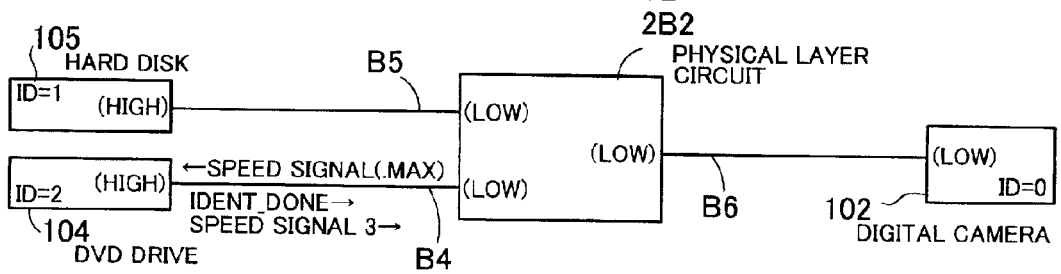

(P57) OUTPUT SELF_ID PACKET OF ID = 3

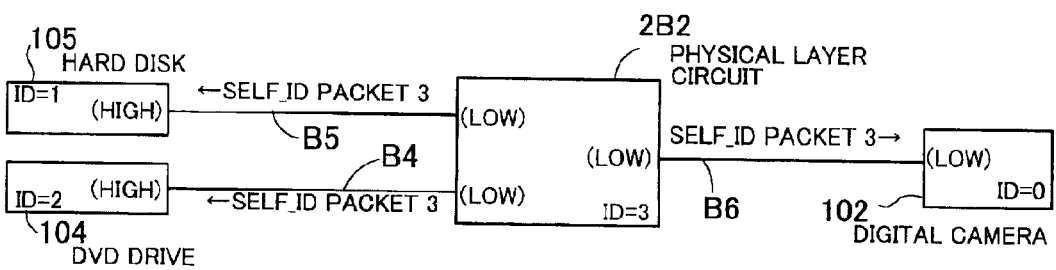

(P58) OUTPUT SELF_ID PACKET OF ID = n AND FINISH SELF-IDENTIFYING OPERATION

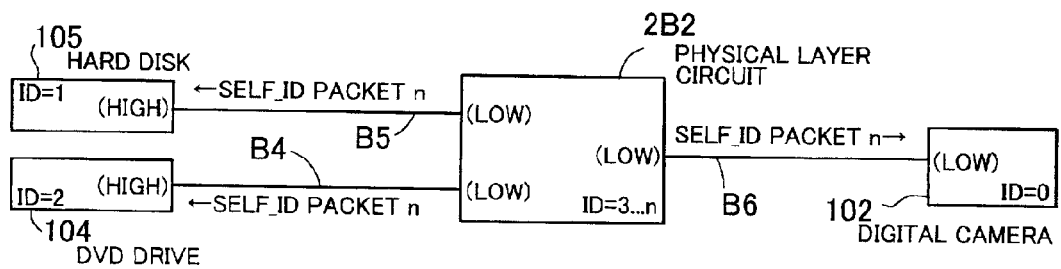

SERIAL BUS INTERFACE DEVICE

BACKGROUND OF THE INVENTION

1. Field of the Invention

The present invention relates to a serial bus interface device to be connected to a next-generation digital interface typified by the IEEE 1394 serial bus. More particularly, the invention relates to a serial bus interface device suitable as a bus analyzer for checking a communication state on a bus such as an IEEE 1394 serial bus, operations of a device connected to the bus, and the like.

2. Description of Related Art

A next-generation digital interface typified by the IEEE 1394 serial bus is used not only for data transfer between a personal computer and a peripheral device of the personal computer but also for transfer of multimedia data such as moving picture data between a digital AV device such as a digital camera or a DVD player and a personal computer and between digital AV devices. The digital interface is therefore requested to have a high data transfer speed. The application range of the digital interface includes ordinary households. Consequently, what is called a plug-and-play function which can deal with the insertion or withdrawal of a device in a power-on state is necessary.

The IEEE 1394 serial bus has a high data transfer speed such that a packet transfer speed is 100 to 400 megabits per second and supports two kinds of transfer modes: a synchronous transfer mode for stable transfer of multimedia data; and an asynchronous transfer mode for transferring conventional-type data and the like. In order to realize the plug-and-play function, the IEEE 1394 serial bus has a function of reconstructing the topology by executing an initial sequence when a device is inserted or withdrawn, and automatically assigning an identification number (ID) to each device.

For example, as shown in FIG. 1, in order to analyze the communication state between a personal computer 101 (ID=1) and a digital camera 102 (ID=0) which are connected via an IEEE 1394 serial bus B, it is necessary to allow a bus analyzer 100 to receive packets on the bus B. For this purpose, a construction that the bus analyzer 100 has a physical layer circuit compliant with the communication protocol of the IEEE 1394 standard is achieved by inserting the bus analyzer 100 on the bus B connecting the personal computer 101 and the digital camera 102. Specifically, the personal computer 101 and the bus analyzer 100 are connected via a bus B1 and the bus analyzer 100 and the digital camera 102 are connected via a bus B2. The IEEE 1394 serial bus reconstructs a bus topology, assigns a new ID (=1) to the bus analyzer 100 via a physical layer circuit, and recognizes the bus analyzer 100 as a device connected to the buses B1 and B2. After the bus analyzer 100 is incorporated into the IEEE 1394 serial bus and the communication on the buses B1 and B2 becomes possible, the bus analyzer 100 analyzes the communication state between the personal computer 101 and the digital camera 102. In this case, since the ID is simultaneously reassigned to an existing device, the personal computer 101 is recognized as a device having the ID of 2 in place of the ID of 1.

FIG. 2 shows a case where (n+1) devices are connected on the serial bus and a method of analyzing the communicating operation, for example, on a bus BB of a device A (ID=0) in an IEEE 1394 serial bus system comprising devices A to H (IDs=0 to 7) and other devices (IDs=8 to n). A case of, for example, analyzing the communicating operation of the device A such as a newly-developed hard disk drive which is connected to the bus is assumed. The bus BB connecting the device A (ID=0) and the device B (ID=4) is divided into a bus BB1 and a bus BB2, and the bus analyzer 100 having a physical layer circuit is inserted between the buses BB1 and BB2. In this case as well, in a manner similar to the case of FIG. 1, the IEEE 1394 serial bus reconstructs the bus topology, recognizes the bus analyzer 100 as a device having the ID of 1, resets the IDs of the other devices, and constructs an IEEE 1394 serial bus in a state where the bus analyzer 100 is incorporated. The communications on the buses BB1 and BB2 become possible and the bus analyzer 100 analyzes the communicating operation of the device A.

In order to analyze the communicating state between the personal computer 101 and the digital camera 102, however, the serial bus interface device used as the bus analyzer 100 shown in FIG. 1 has to be inserted in the bus B connecting the personal computer 101 and the digital camera 102 via the physical layer circuit. By inserting the bus analyzer 100, the bus analyzer 100 itself becomes one of the devices on the bus. Consequently, the bus configuration has a topology including the bus analyzer 100 which does not exist in an inherent connection environment. It causes a problem such that analysis in a communication environment in the inherent topology cannot be performed.

Further, in the serial bus interface device used as the bus analyzer 100 shown in FIG. 2, in a manner similar to the case of FIG. 1, by inserting the bus analyzer 100, the configuration of buses changes and it causes a problem such that analysis in a communication environment in the inherent topology cannot be performed.

When the communicating state of a bus has to be analyzed in a state where a number of devices are connected to the bus, it is necessary to connect all the devices so as to be adapted to a regular use environment and then analyze the communicating state. When the analysis has to be performed in a state where there are a number of devices to be connected or a number of kinds of devices, there is a problem such that enormous efforts are required to set an analysis environment.

SUMMARY OF THE INVENTION

The invention has been achieved to solve the problems of the conventional arts and an object of the invention is to provide a serial bus interface device having a physical layer circuit, which is to be connected to a serial bus such as an IEEE 1394 serial bus, can be inserted or withdrawn without exerting an influence on the bus topology, can simulate a plurality of devices, and is suitably used as a bus analyzer for analyzing a communicating state of a bus.

In order to achieve the object, according to one aspect of the invention, a serial bus interface device having a function of automatically reconstructing a topology when the device is inserted or withdrawn during operation of a serial bus comprises a physical layer circuit serving as a physical interface without being given an identification number when the serial bus interface device is connected to the serial bus.

The serial bus interface device can be connected without changing the topology environment of existing devices connected to the serial bus and without exerting an influence on responses on the serial bus. The physical layer circuit of the serial bus interface device connected can serve as a physical interface with the serial bus, so that data on the serial bus can be detected.

According to another aspect of the invention, a serial bus interface device having a function of automatically reconstructing a topology when the device is inserted or withdrawn during operation of a serial bus comprises a physical layer circuit serving as a physical interface to which one or more identification numbers are assigned when the serial bus interface device is connected to the serial bus.

When the serial bus interface device is connected to the serial bus, the physical layer circuit can send responses in a manner similar to a case where all of one or more devices each having an identification number are connected. By the single serial bus interface device, the environment which is the same as that in the case where a number of devices are connected can be realized.

The above and further novel features of the invention will more fully appear from the following detailed description when the same is read in connection with the accompanying drawings. It is to be expressly understood, however, that the drawings are purpose of illustration only and not intended as a definition of the limits of the invention.

BRIEF DESCRIPTION OF THE DRAWINGS

FIG. 3 shows a configuration of an IEEE 1394 bus to which a bus analyzer of a first embodiment is connected.

FIG. 4 is a state transition diagram showing a tree-identifying operation in the first embodiment.

FIG. 5 is a state transition diagram showing a self-identifying operation in the first embodiment.

FIG. 6 shows an operation sequence in the case of receiving a parent_notifying signal by one of ports in the tree-identifying operation in the first embodiment.

FIG. 7 shows an operation sequence in the case of receiving a parent_notifying signal by both ports in the tree-identifying operation in the first embodiment.

FIG. 8 shows an operation sequence of the self-identifying operation in the first embodiment.

FIG. 16 is a state transition diagram showing a self-identifying operation in the first configuration example of the second embodiment.

FIG. 17 shows an operation sequence of the case where arbitration of a device connected on the other side is higher in the self-identifying operation in the first configuration example of the second embodiment.

FIG. 18 shows an operation sequence of the case where arbitration of a device connected on the other side is lower in the self-identifying operation in the first configuration example of the second embodiment.

FIG. 19 shows a second configuration example of the IEEE 1394 bus to which the bus analyzer of the second embodiment is connected.

FIG. 20 is a state transition diagram showing a self-identifying operation in a second configuration example of the second embodiment.

FIG. 21 shows a front stage portion of an operation sequence in the case where there is a device having high arbitration to be connected on the other side in the self-identifying operation in the second configuration example of the second embodiment.

FIG. 22 shows an intermediate stage portion of the operation sequence in the case where there is a device having high arbitration to be connected on the other side in the self-identifying operation in the second configuration example of the second embodiment.

FIG. 23 shows a post stage portion of the operation sequence in the case where there is a device having high arbitration to be connected on the other side in the self-identifying operation in the second configuration example of the second embodiment.

FIG. 24 shows a front stage portion of an operation sequence in the case where there is no device having high arbitration to be connected on the other side in the self-identifying operation in the second configuration example of the second embodiment.

FIG. 25 shows a post stage portion of the operation sequence in the case where there is no device having high arbitration to be connected on the other side in the self-identifying operation in the second configuration example of the second embodiment.

DETAILED DESCRIPTION OF THE PREFERRED EMBODIMENTS

Figure 1:
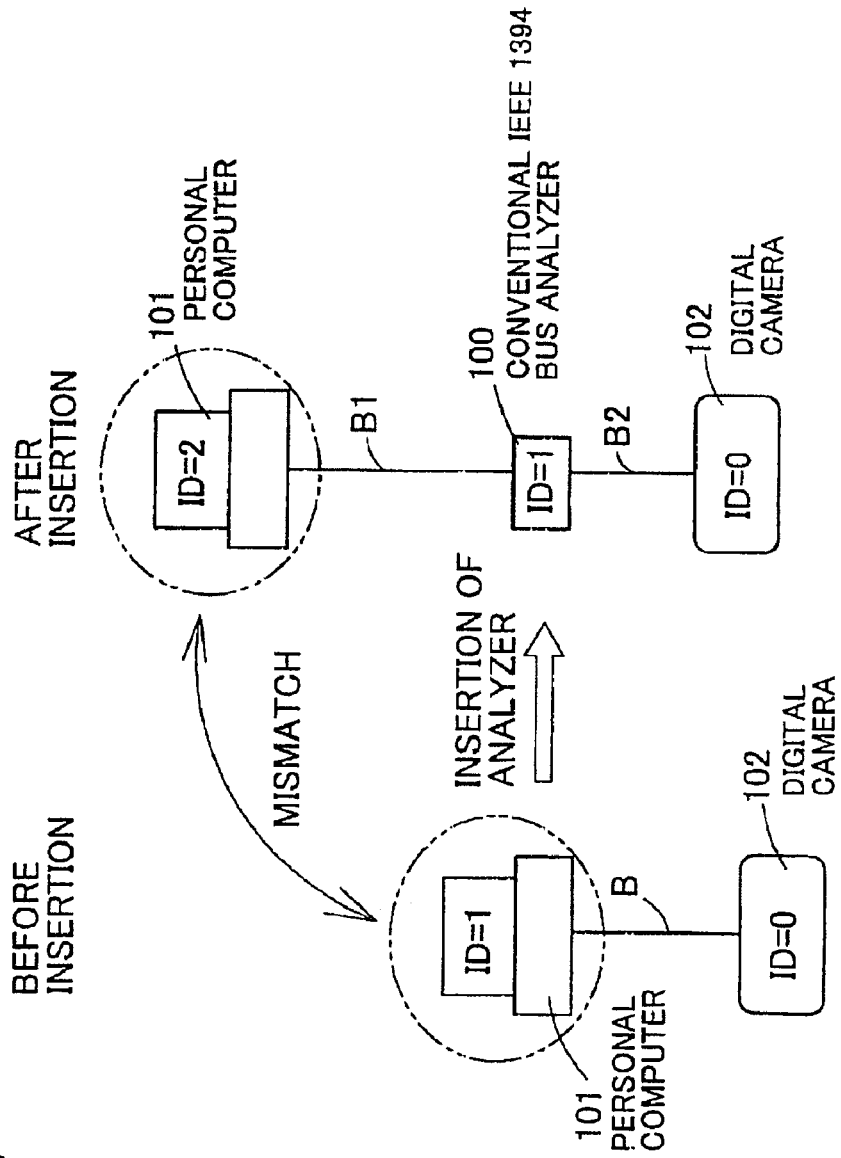
FIG. 1 shows an IEEE 1394 bus configuration in which a conventional bus analyzer is connected.
Figure 2:
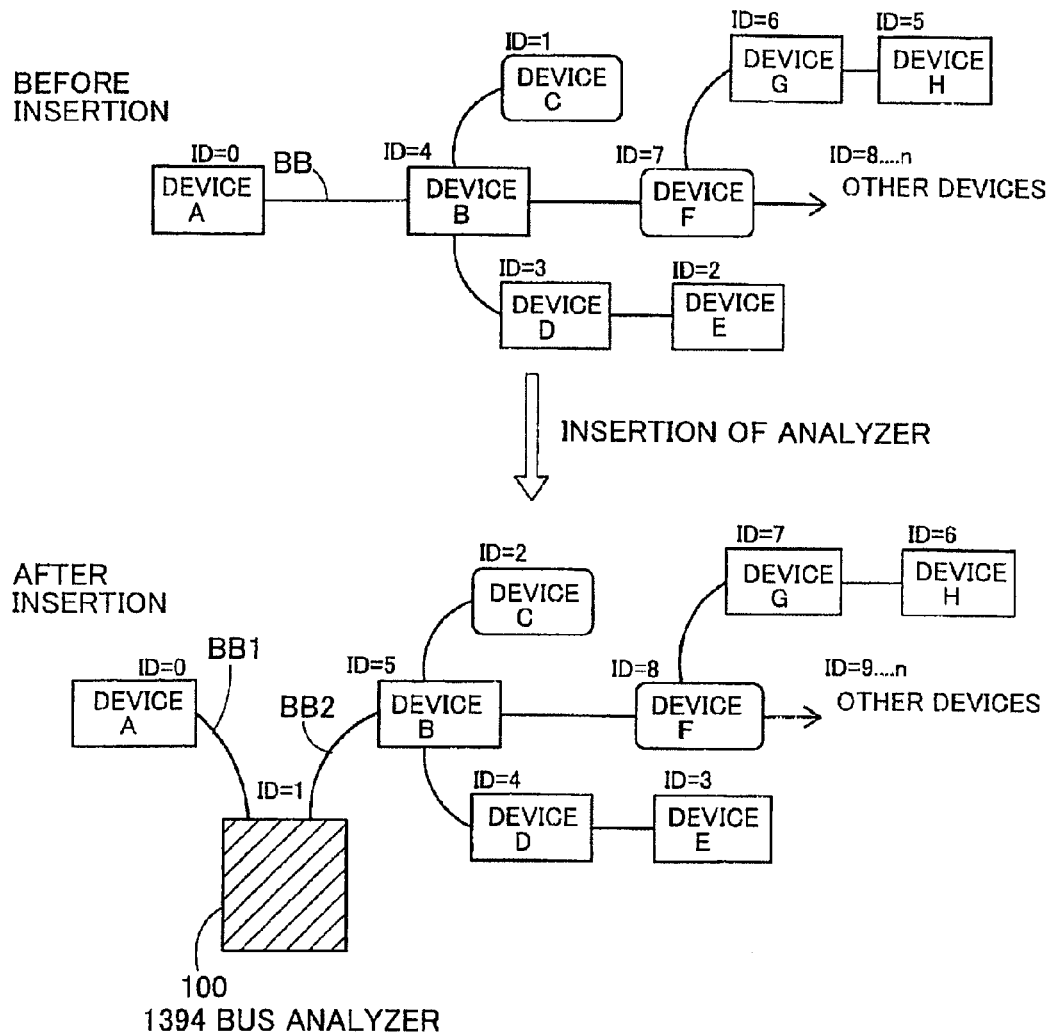
FIG. 2 shows a configuration in which a conventional bus analyzer is connected to an IEEE 1394 bus to which a number of devices are connected.

A serial bus interface device according to an embodiment of the invention will be described in detail hereinbelow with reference to FIGS. 3 to 25.

FIG. 3 shows the configuration of an IEEE 1394 bus to which a bus analyzer according to a first embodiment of the invention is connected. In order to analyze a communicating state on a bus in a system (not shown) in which the personal computer 101 having an identification number (hereinbelow, referred to as an ID) of 1 and the digital camera 102 having an ID of 0 are connected via an IEEE 1394 serial bus, a bus analyzer 1A of the invention is inserted between the personal computer 101 and the digital camera 102, the personal computer 101 and the bus analyzer 1A are connected via a bus B1, and the digital camera 102 and the bus analyzer 1A are connected via a bus B2. The bus analyzer 1A interfaces with the IEEE 1394 buses B1 and B2 by a physical layer circuit 2A in the bus analyzer 1A, thereby making communications with the buses possible. Received data is analyzed by a data analyzing circuit 3 at the post stage. As will be described hereinlater, even when the bus analyzer 1A is inserted, an ID is not assigned to the physical layer circuit 2A (having no ID) and, in such a state, the topology is reconstructed. The IDs of the personal computer 101 (ID=1) and the digital camera 102 (ID=0) therefore do not change before and after the insertion of the bus analyzer 1A. The communicating state can be analyzed without changing the bus topology of the system to be analyzed (in this case, the system constructed by the personal computer 101 (ID=1) and the digital camera 102 (ID=0)).

Referring to FIGS. 4 to 8, the procedure of reconstructing the topology without assigning an ID to the physical layer circuit 2A in a sequence of initializing the IEEE 1394 bus in the physical layer circuit 2A when the bus analyzer 1A is inserted to the system to be analyzed will be described. FIG. 4 is a state transition diagram showing a tree-identifying operation of determining a tree structure of a topology on insertion of the bus analyzer 1A and reset of the bus. Each of FIGS. 6 and 7 shows an actual operating sequence in the case of inserting the bus analyzer 1A into the system to be analyzed which comprises the personal computer 101 and the digital camera 102 in accordance with the state transition of FIG. 4. FIG. 5 is a state transition diagram showing a self-identifying operation of assigning IDs to devices after determining the tree structure. FIG. 8 shows an operating sequence of assigning an ID to the system to be analyzed which comprises the personal computer 101 and the digital camera 102, to which the bus analyzer 1A is inserted in accordance with the state transition.

First, a case of receiving a parent_notification signal by one of the ports of the physical layer circuit 2A in the tree-identifying operation will be described with reference to FIGS. 4 to 6. The parent_notification signal is a signal declaring that a port has high arbitration of the bus among ports connected to one of branches constructing the tree structure. When the bus analyzer 1A is inserted and the bus reset is completed, in a state (hereinbelow, referred to as "S") 1 in FIG. 4, according to a time-out sequence, an idle signal is periodically transmitted to notify that the physical layer circuit 2A in the bus analyzer 1A is in a stand-by state in the tree-identifying operation.

On condition that the parent_notification signal is received by one of the ports of the physical layer circuit 2A in such a state (S2 in FIG. 4), a child_notification signal is outputted to the same port (S3 in FIG. 4). It corresponds to procedures (hereinbelow, referred to as "P") 1 and 2 in the operating sequence of FIG. 6, in which on condition that the physical layer circuit 2A receives the parent_notification signal outputted from the digital camera 102 to the serial bus B2 (P1), the child_notification signal is outputted from the port toward the digital camera 102 (P2 in FIG. 6).

When the digital camera 102 which has received the child_notification signal stops outputting the parent_notification signal, a child_handshake state is received (S4 in FIG. 4 and P3 in FIG. 6), thereby determining the tree structure between the physical layer circuit 2A and the digital camera 102. Subsequently, the physical layer circuit 2A outputs the parent_notification signal to the other port (S5 in FIG. 4 and P4 in FIG. 6).

The operation of outputting the signal is continued until the device on the other side returns the child_notification signal, the parent_handshake state is received, and the tree structure is determined. That is, in FIG. 6, in the case where both the physical layer circuit 2A and the personal computer 101 output the parent_notification signal onto the bus B1, a root_contention state occurs according to the standard of the IEEE 1394 bus, and the personal computer 101 stops outputting the parent_notification signal (P5 in FIG. 6). On the other hand, the physical layer circuit 2A keeps on outputting the parent_notification signal (S5 in FIG. 4 and P5 in FIG. 6). After the time out of the personal computer 101, the personal computer 101 receives the parent_notification signal. In response to the signal, the personal computer 101 outputs the child_notification signal to the bus B1 and receives a parent_handshake state (P6 in FIG. 6), thereby determining the tree structure and finishing the tree identifying operation (S6 in FIG. 4 and P12 in FIG. 6).

Although the mode in which the physical layer circuit 2A of the bus analyzer 1A responds to the signals received by each of the ports has been described as an example in the foregoing embodiment, the invention is not limited to the mode. It is also possible to determine the tree structure by sending a signal received by one of the ports to the other port.

A case of receiving the parent_notification signal by both ports of the physical layer circuit 2A in the tree-identifying operation will now be described with reference to FIGS. 4 to 7. In the following description, parts similar to those described above will not be described.

In the idle state (S1 in FIG. 4), when the parent_notification signal is received from each of the personal computer 101 and the digital camera 102 by both ports of the physical layer circuit 2A (S2 in FIG. 4 and P7 in FIG. 7), the physical layer circuit 2A outputs the child_notification signal to an arbitrary port (S3 in FIG. 4). In FIG. 7, the child_notification signal is outputted toward the digital camera 102 (P8 in FIG. 7).

When the digital camera 102 which has received the child_notification signal stops outputting the parent_notification signal and the child_handshake state is received (S4 in FIG. 4 and P9 in FIG. 7), the structure of the tree is determined and the parent_notification signal is outputted to the other port toward the personal computer 101 (S5 in FIG. 4 and P9 in FIG. 7).

The following sequence is similar to the above-described case. To be specific, in the period from the receipt of the parent_handshake state until the determination of the tree structure, the physical layer circuit 2A keeps on outputting the parent_notification signal (S5 in FIG. 4 and P9 and P10 in FIG. 7). During the period of time, in FIG. 7, the parent_notification signal from the physical layer circuit 2A and that from the personal computer 101 collide with each other, so that a root_contention state is derived. Although the personal computer 101 stops outputting the parent_notification signal (P9 and P10 in FIG. 7), the physical layer circuit 2A continuously outputs the parent_notification signal (P10 in FIG. 7). After the time out, the personal computer 101 receives the parent_notification signal and returns the child_notification signal, thereby receiving the parent_handshake state, determining the tree structure (P11 in FIG. 7) and finishing the tree-identifying operation (S6 in FIG. 4 and P12 in FIG. 7).

When the tree structure is determined by the tree-identifying operation, the arbitration of each of the ports connected to the bus is decided. More specifically, with respect to the bus B1 in FIG. 6, arbitration lower than that of the personal computer 101 is set to the port of the personal computer 101, and arbitration higher than that of the bus analyzer 1A is set to the port of the bus analyzer 1A. With respect to the bus B2, arbitration higher than that of the digital camera 102 is set to the port of the digital camera 102, and arbitration lower than that of the bus analyzer 1A is set to the port of the bus analyzer 1A. In the following description, the port having high arbitration is defined as a parent port (it is described as "high" in FIG. 6 and subsequent drawings), and the port having low arbitration is defined as a child port (it is described as "low" in FIG. 6 and subsequent drawings). A device whose ports connected to a bus are all child ports is defined as a "root". In FIGS. 6 and 7, the personal computer 101 is a root.

The self-identifying operation will now be described with reference to FIGS. 5 and 8. After the tree-identifying operation is finished, in an idle state in which no signal is outputted from each of the ports (S7 in FIG. 5), when a self_ID_grant signal generated from the personal computer 101 as a root in order to retrieve a device to which the least significant ID is to be given is received by the parent port of the bus analyzer 1A (S8 in FIG. 5), the physical layer circuit 2A outputs the self_ID_grant signal to the child port of the bus analyzer 1A (S9 in FIG. 5 and P13 in FIG. 8).

When the device which receives the self_ID_grant signal and to which an ID is assigned (the digital camera 102 in FIG. 8 to which the ID of 0 is assigned) returns a self_ID packet (self_ID packet 0) and the child port of the bus analyzer 1A receives the self_ID packet (S10 in FIG. 5 and P14 in FIG. 8), the self_ID packet is transferred to the parent port (S11 in FIG. 5 and P14 in FIG. 8).

Further, when the child port receives an ident_done signal from the digital camera 102 to which the ID of 0 is assigned (S12 in FIG. 5 and P15 in FIG. 8), the ident_done signal and a speed signal indicative of a data transfer speed received by the child port are transferred to the parent port (S13 in FIG. 5 and P15 in FIG. 8). The speed signal returned from the personal computer 101 to the parent port is transferred to the child port (S13 in FIG. 5 and P16 in FIG. 8), thereby determining the data transfer speed between the personal computer 101 and the digital camera 102.

When a self_ID packet (self_ID packet 1) from the personal computer 101 is received by the parent port (S14 in FIG. 5 and P17 in FIG. 8), the ID of the personal computer 101 as a device connected to the parent port side is also determined as "1", and the self-identifying operation is finished. In P17 in FIG. 8, the operation of transferring the self_ID packet (self_ID packet 1) to the child port is an operation executed in regular arbitration.

Each of the state transition from S7 to S11 in association with the reception of the self_ID packet by the parent port in FIG. 5 and the state transition from S11 to S7 in association with the end of the self_ID packet represents the function of performing the self-identifying operation without outputting the self_ID_grant signal. In this case as well, an ID is not assigned to the bus analyzer 1A.

As described above, in the case where the bus analyzer 1A of the first embodiment is inserted between the serial buses B1 and B2 of the system to be analyzed, since the bus analyzer 1A has the physical layer circuit 2A, the bus analyzer 1A can construct a physical interface between the buses B1 and B2 without being assigned an ID in the bus initializing sequence executed after the insertion. Without changing the topology environment of the system to be analyzed in which the personal computer 101 and the digital camera 102 are directly connected to the serial buses, the bus analyzer 1A as a serial bus interface device can be connected. Further, the physical layer circuit 2A of the bus analyzer 1A inserted can construct a physical interface with the buses B1 and B2, detect data on the buses B1 and B2, and analyze and investigate the communicating state on the buses B1 and B2.

Figure 9:
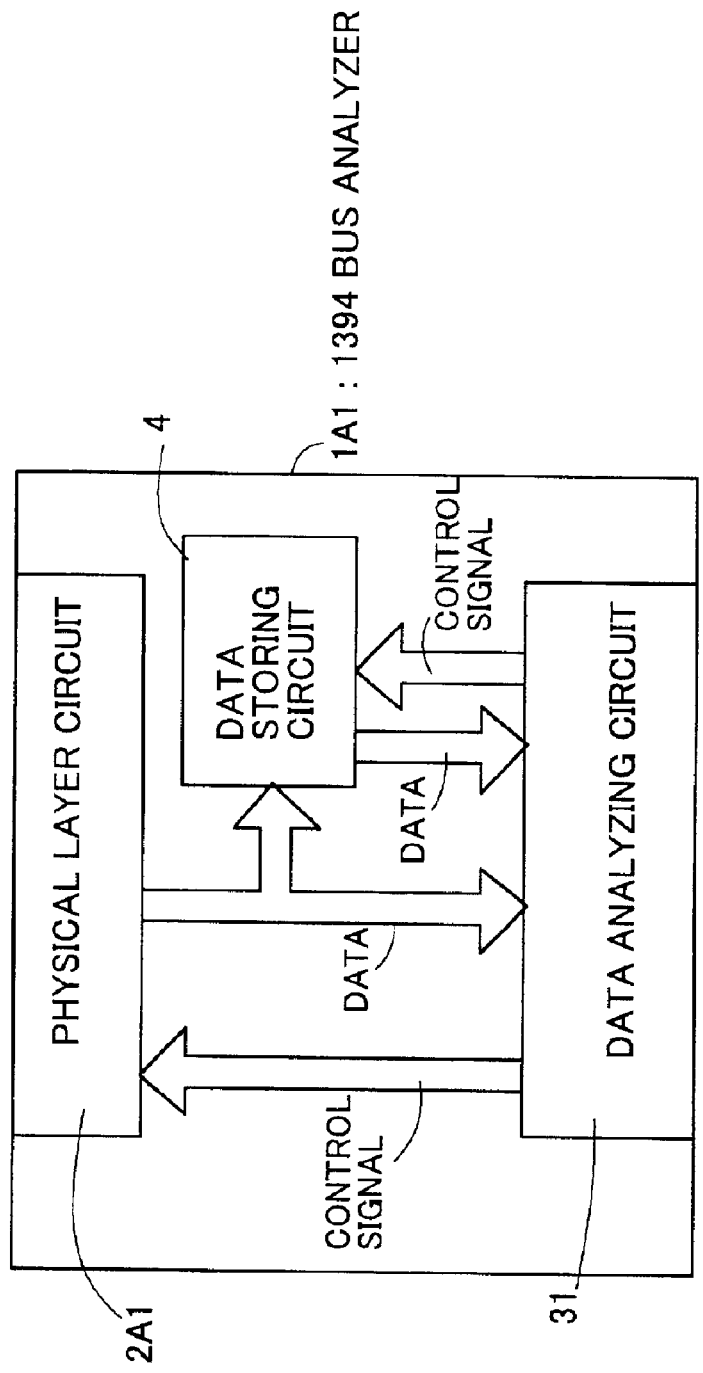
FIG. 9 is a circuit block diagram showing a first modification of the bus analyzer in the first embodiment.

Bus analyzers 1A1 to 1A6 as first to sixth modifications of the first embodiment will now be described. FIG. 9 shows the first modification. The bus analyzer 1A1 has a data storing circuit 4 for storing data on the serial buses B1 and B2 received by the physical layer circuit 2A1. The bus analyzer 1A1 can construct a physical interface with the buses B1 and B2 without being given an ID. Consequently, the data on the buses B1 and B2 can be acquired without changing the topology environment of the system to be analyzed and without exerting an influence on the communicating operation. The data can be directly transferred to a data analyzing circuit 31 and analyzed. In addition, data can be properly stored and read to/from the data storing circuit 4 in accordance with a control signal from the data analyzing circuit 31. A series of continuous data or data in a specific sequence can be therefore collected and analyzed. The data can be also analyzed by comparison with data directly transferred from the physical layer circuit 2A1. Thus, the analysis can be effectively performed.

Figure 10:
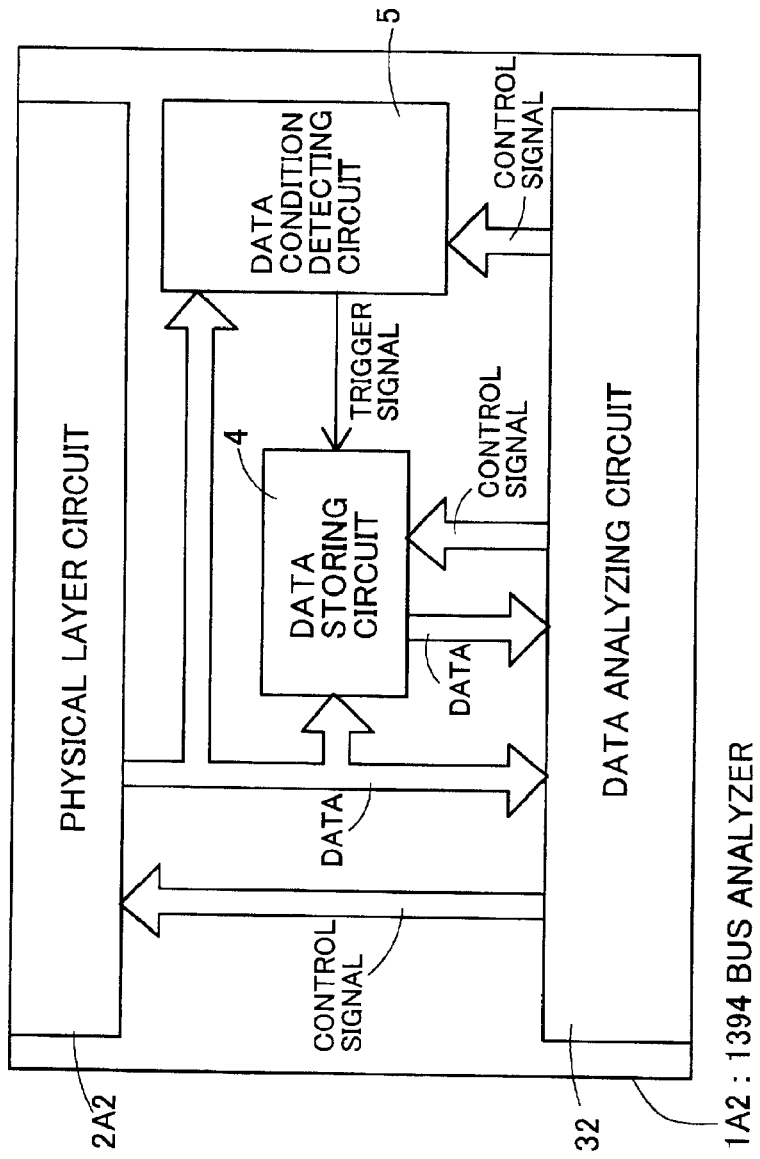
FIG. 10 is a circuit block diagram showing a second modification of the bus analyzer in the first embodiment.

FIG. 10 shows a second modification. The bus analyzer 1A2 has, in addition to the data storing circuit 4, a data condition detecting circuit 5. The data condition detecting circuit 5 monitors data received by the physical layer circuit 2A2 and, when data matching a predetermined condition is detected, outputs a trigger signal. The bus analyzer 1A2 can store data received in response to the output of the trigger signal into the data storing circuit 4 and has a function of performing an operation on the stored data in a manner similar to the first modification. By setting the data condition on which the trigger signal is outputted in a specific data sequence, data can be stored each time the same sequence is generated. Consequently, analysis suitable for the case where a malfunction occurs under a specific condition can be performed.

Figure 11:
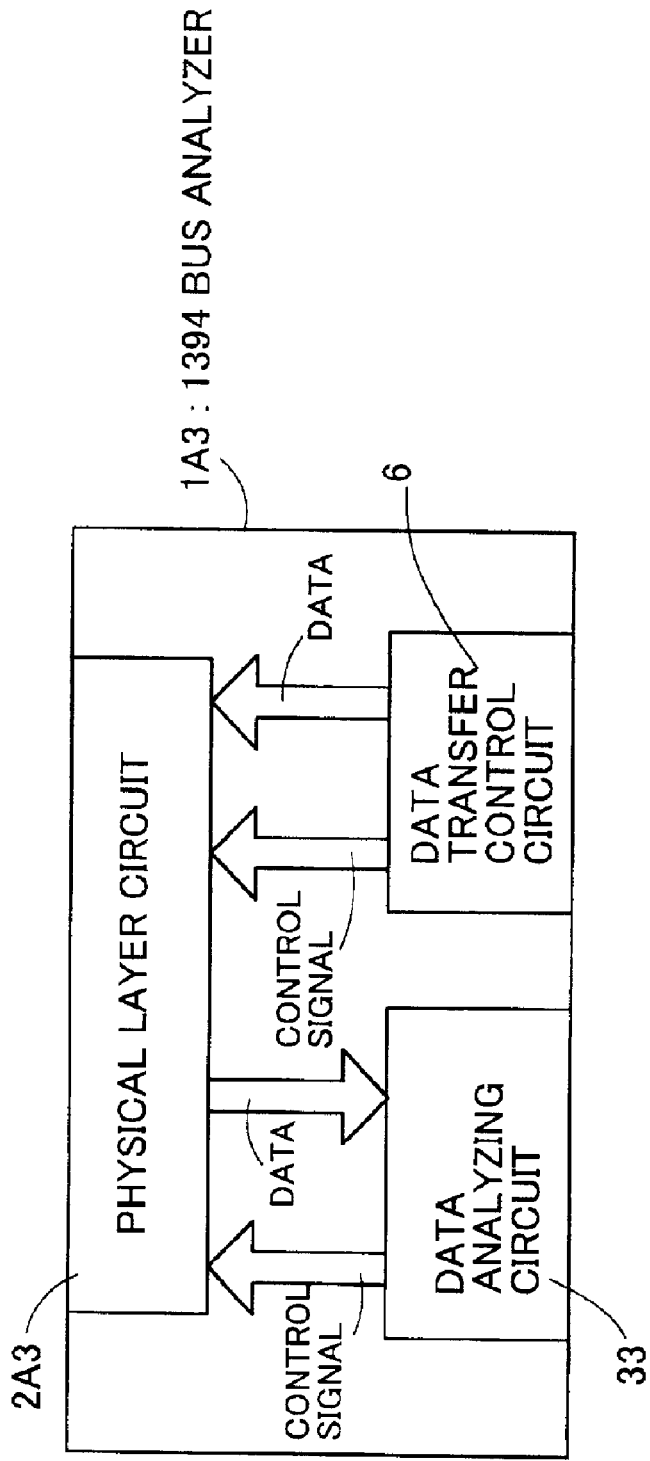
FIG. 11 is a circuit block diagram showing a third modification of the bus analyzer in the first embodiment.

FIG. 11 shows a third modification. A bus analyzer 1A3 has, in addition to a data analyzing circuit 33, a data transfer control circuit 6. The data transfer control circuit 6 performs a control of transferring data to be transmitted as it is to the physical layer circuit 2A3 or forming data into a packet compatible with the protocol on the serial bus and transferring the packet to the physical layer circuit 2A3. The modification is suited to the case of recognizing a response on the bus to a predetermined data packet.

Figure 12:
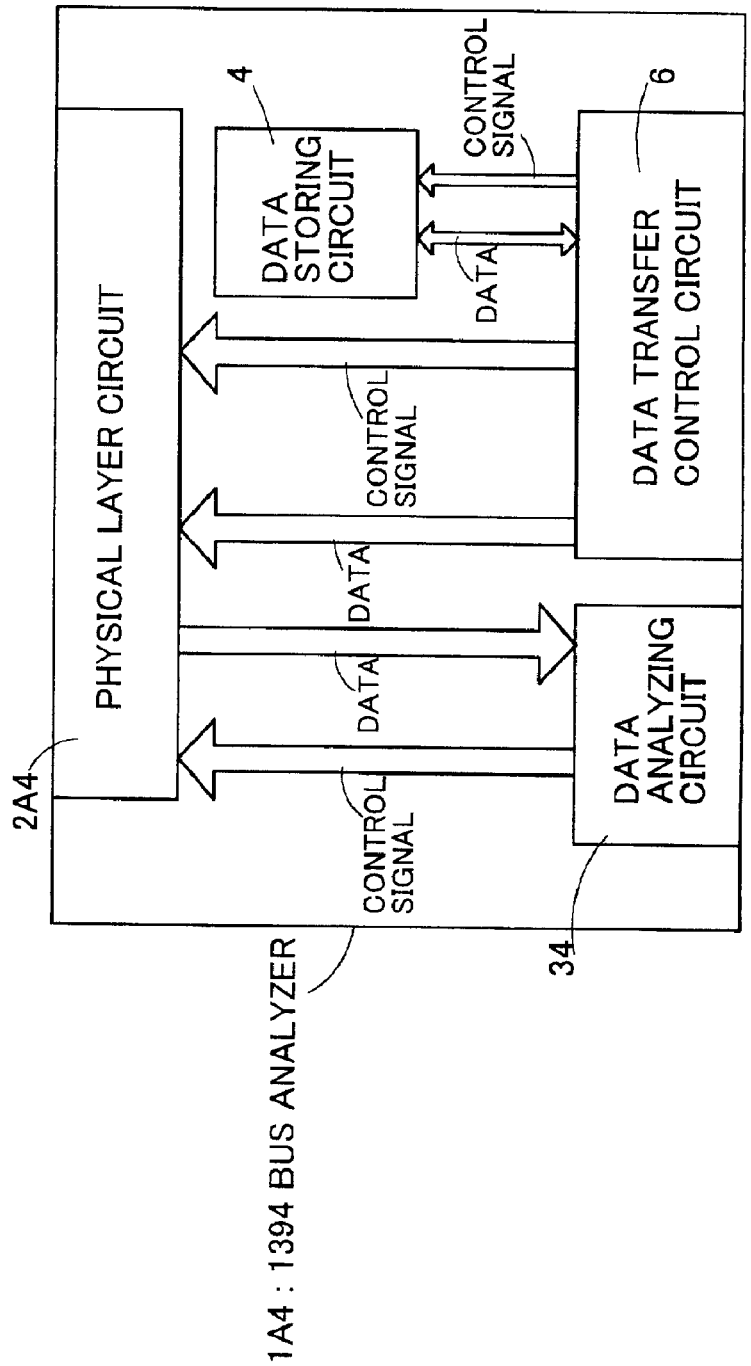
FIG. 12 is a circuit block diagram showing a fourth modification of the bus analyzer in the first embodiment.

FIG. 12 shows a fourth modification. A bus analyzer 1A4 has, in addition to a data analyzing circuit 34 and the data transfer control 6, the data storing circuit 4. The data storing circuit 4 can prestore data to be transmitted and performs a control of transferring the data as it is or forming data in a packet compatible with the protocol on the serial bus and then transferring the packet to the physical layer circuit 2A4 as necessary. By storing plural data, each of responses on the serial bus to each of data packets can be recognized. Further, by arbitrarily setting a transmission sequence of data packets, a response to a specific packet sequence or a response in a state where communications on the bus are congested can be also recognized.

Figure 13:
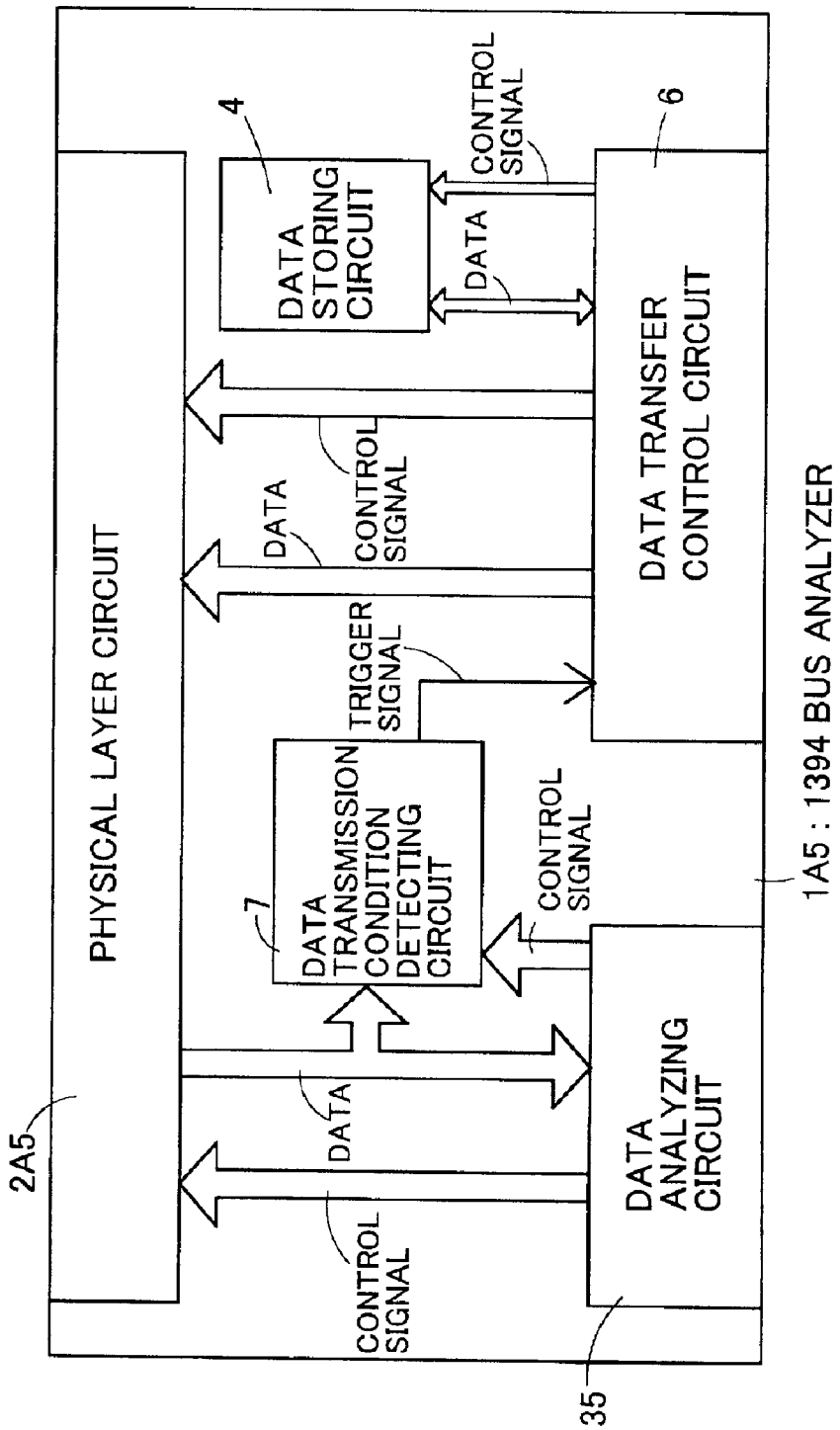
FIG. 13 is a circuit block diagram showing a fifth modification of the bus analyzer in the first embodiment.

FIG. 13 shows a fifth modification. A bus analyzer 1A5 has, in addition to a data analyzing circuit 35, the data storing circuit 4, and the data transfer control circuit 6, a data transmission condition detecting circuit 7. The data transmission condition detecting circuit 7 monitors data received by the physical layer circuit 2A5 and, when data matching a predetermined condition is detected, outputs a trigger signal. On output of the trigger signal, the bus analyzer 1A5 performs a control of transferring data to be transmitted as it is which is stored in the data storing circuit 4 to the physical layer circuit 2A5 or forming the data to be transmitted into a packet compatible with the protocol on the serial bus and transferring the packet to the physical layer circuit 2A5. By setting a condition of data to be received upon which the trigger signal is outputted in a specific data sequence, each time the same sequence is generated, predetermined data in the data stored in the data storing circuit 4 can be transmitted. The same response can be therefore always sent to the specific data sequence. Thus, the modification is the optimum to recognize a response on the serial bus.

Figure 14:
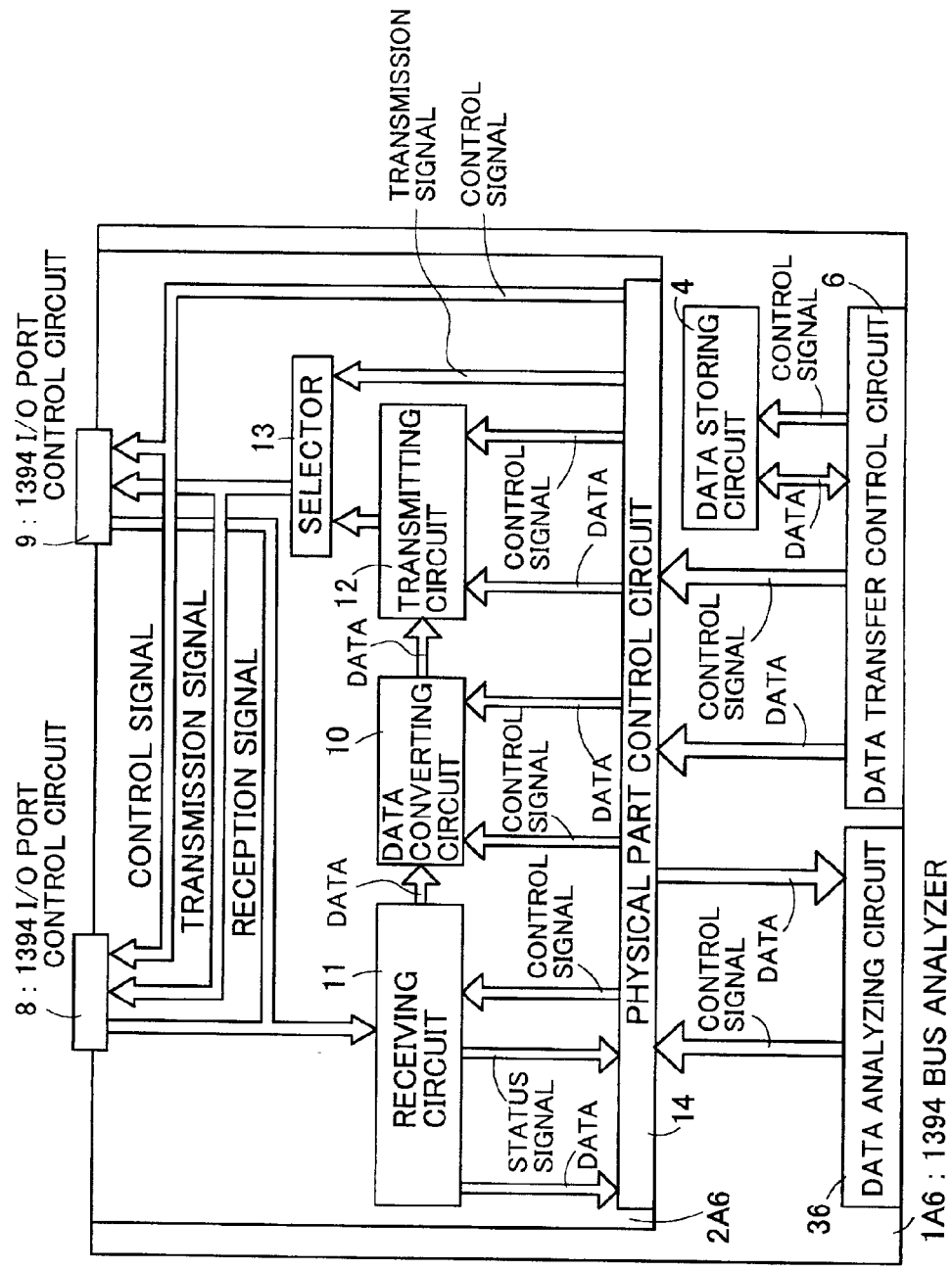
FIG. 14 is a circuit block diagram showing a sixth modification of the bus analyzer in the first embodiment.

FIG. 14 shows a sixth modification. A physical layer circuit 2A6 has a pair of ports, a receiving circuit 11, a data converting circuit 10 for converting data included in a packet received by the receiving circuit 11, and a transmitting circuit 12 for forming a packet from the data converted by the data converting circuit 10. The ports of transmission and reception are switched by a selector 13. On the basis of either the analysis of reception data by a data analyzing circuit 36 or the data to be transmitted which is stored in the data storing circuit 4, data received by the receiving circuit 11 in the physical layer circuit 2A6 is converted by the data converting circuit 10. In the modification, a communication error such as a bit error or a burst error in the communication on the serial bus can be simulated, and a communication response of an error correcting function or the like can be recognized.

Figure 15:
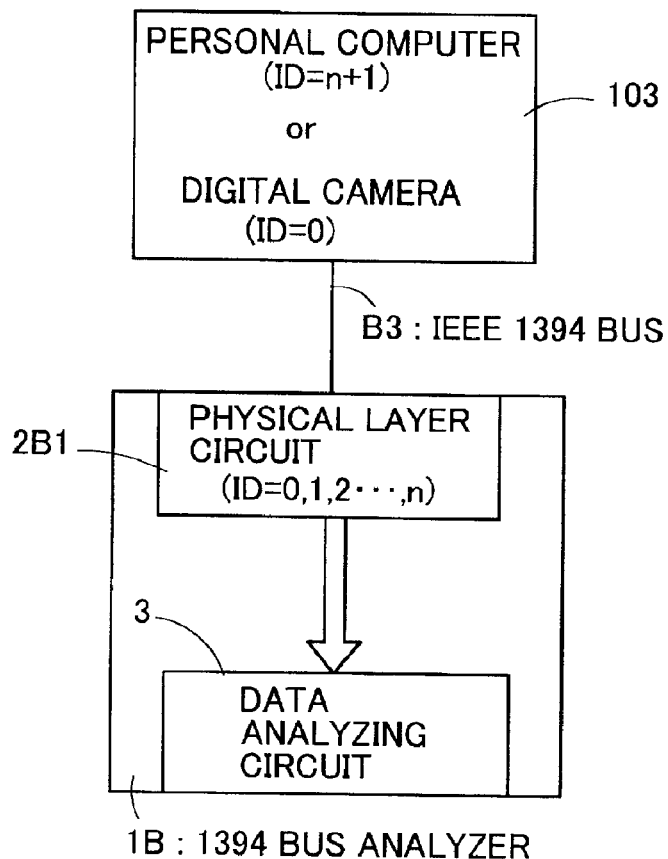
FIG. 15 shows a first configuration example of an IEEE 1394 bus to which a bus analyzer of a second embodiment is connected.

A second embodiment will now be described. FIG. 15 shows a first configuration example of an IEEE 1394 bus to which a bus analyzer of the second embodiment of the invention is connected. The first configuration example relates to a case where a group of devices having a plurality of IDs are simulated by a bus analyzer 1B. It is intended for analyzing or investigating a response on a serial bus B3 of a personal computer 103 (or digital camera 103) in the case where (n+1) devices having IDs 0 to n (or n devices having IDs 1 to n) are connected to the personal computer 103 having an ID of (n+1) (or the digital camera 103 having an ID of 0). For analysis and investigation, it is not necessary to actually construct a system to be analyzed by preparing (n+1) devices having IDs 0 to n (or n devices having IDs 1 to n), a connection environment which is the same as that of a system to be analyzed can be created by connecting the bus analyzer 1B and the personal computer 103 (or digital camera 103) via a serial bus B3. The bus analyzer 1B interfaces with an IEEE 1394 bus B3 in a physical layer circuit 2B1 in the bus analyzer 1B and realizes data transmission/reception to/from the bus B3. Received data is analyzed by the data analyzing circuit 3 at the post stage. In the interface, the topology is constructed by assigning a plurality of IDs to the physical layer circuit 2B1 as will be described hereinlater. Consequently, only by connecting the personal computer 103 (or digital camera 103) to the bus analyzer 1B, an environment in which a plurality of devices are connected can be created.

The initializing sequence of the IEEE 1394 bus in the first configuration example of the second embodiment in FIG. 15 will now be described hereinbelow. Since the tree structure is determined in conformity with the IEEE 1394 standard, description of the tree-identifying operation of determining the tree structure of the topology is omitted here. A self-identifying operation of assigning IDs to devices will be described. FIG. 16 is a state transition diagram showing the self-identifying operation in the first configuration example of the second embodiment in FIG. 15. FIG. 17 shows an operation sequence of the case where the device to which the bus analyzer 1B is connected is the personal computer 103 (ID=n+1) having high arbitration. FIG. 18 shows an operation sequence of the case where the device to which the bus analyzer 1B is connected is the digital camera 103 (ID=0) having low arbitration.

The case where the device to which the bus analyzer is connected is the personal computer 103 will be described first with reference to FIGS. 16 and 17. In FIG. 16, after completion of the tree-identifying operation, an idle state (S21 in FIG. 16) in which no signal is outputted from each of the ports is derived. After that, the personal computer 103 as a root in the topology outputs the self_ID_grant signal to its child port. On condition that the self_ID_grant signal is received by the parent port (S22 in FIG. 16 and P21 in FIG. 17), the physical layer circuit 2B1 in the bus analyzer 1B which is not a root outputs a self_ID packet (self_ID packet 0) to the parent port to set the ID of 0 and increments an ID counter by one (S23 in FIG. 16 and P22 in FIG. 17).

The sequence is repeated until the ID counter becomes n (S24 in FIG. 16) and, subsequent to the ID of 0, IDs 1 to n are sequentially set in the physical layer circuit 2B1 (P23, P24 and P25 in FIG. 17).

When the ID counter becomes n (S25 in FIG. 16), the physical layer circuit 2B1 outputs an ident_done signal and a speed signal (speed signal (.max)) indicative of a maximum data transfer speed of the physical layer circuit 2B1 to the parent port (S26 in FIG. 16 and P26 in FIG. 17). On condition that the setting of the data transfer speed is finished on receipt of the speed signal (speed signal 1) from the personal computer 103 and a self_ID packet (self_ID packet n+1) from the personal computer 103 is received by the parent port (S27 in FIG. 16 and P26 and P27 in FIG. 17), the self-identifying operation is finished.

The case where the device to which the bus analyzer 1B is connected is the digital camera 103 will be described by referring to FIGS. 16 and 18. After completion of the tree-identifying operation in FIG. 16, an idle state (S21 in FIG. 16) in which no signal is outputted from each of the ports is derived. After that, on condition that no IDs (IDS=0 to n-1) are assigned to devices in a lower hierarchy layer ("!child_ID_complete" in FIG. 16) (S28 in FIG. 16), the physical layer circuit 2B1 in the bus analyzer 1B including the root outputs the self_ID_grant signal to the child port (S29 in FIG. 16 and P28 in FIG. 18). The digital camera 103 which has received the self_ID_grant signal gives the ID of 0 to itself and outputs a self_ID packet (self_ID packet 0). Under condition that the self_ID_grant signal is received by the child port (S30 in FIG. 16), the physical layer circuit 2B1 stops outputting (S31 in FIG. 16 and P29 in FIG. 18).

Under condition that an ident_done signal from the digital camera 103 is received and child_ID complete is set (S32 in FIG. 16), the speed signal (speed signal 1) from the digital camera 103 is received and a speed signal (.max)) indicative of the maximum data transfer speed is outputted to the same port (S33 in FIG. 16 and P30 in FIG. 18). The state is finished when a timeout of the speed signal output occurs (S35 in FIG. 16) and the physical layer circuit 2B1 enters an idle state (S21 in FIG. 16).

On set of the child_ID_complete (S22 in FIG. 16), the physical layer circuit 2B1 including the root outputs a self_ID packet (self_ID packet 1) to the child port, gives the ID of 1 to itself, and increments the ID counter by one (S23 in FIG. 16 and P31 in FIG. 18).

The sequence is repeated until the ID counter becomes n (S24 in FIG. 16) and IDS of 2 to n are sequentially set subsequent to the ID of 1 in the physical layer circuit 2B1 (P32 and P33 in FIG. 18).

When the physical layer circuit 2B1 includes a root, on condition that the ID counter becomes n (S35 in FIG. 16), the self-identifying operation is finished and the initializing sequence is completed (P34 in FIG. 18).

The state transition from S21 to S31 upon receipt of the self_ID packet by the parent port in FIG. 16 indicates the function of performing the self-identifying operation without outputting the self_ID_grant signal. The state transition from S31 to S21 represents the process of finishing the self_ID packet without receiving the ident_done signal.

As described above, since the bus analyzer 1B can simulate the group of devices having a plurality of IDs, even in the case of analyzing or investigating the system in which (n+1) devices having IDs of 0 to (n) (or n devices having IDs of 1 to n) are connected to the personal computer 103 having the ID of (n+1) (or the digital camera 103 having the ID of 0), it is unnecessary to actually construct a system to be analyzed by preparing (n+1) devices having IDs of 0 to n (or n devices having IDs 1 to n). By connecting the bus analyzer 1B and the personal computer 103 (or digital camera 103) via the serial bus B3, the physical layer circuit 2B1 in the bus analyzer 1B interfaces with the bus B3 in a state where a plurality of IDs are assigned to the physical layer circuit 2B1, and data is analyzed by the data analyzing circuit 3 at a post stage. Only by connecting a device to be analyzed to the bus analyzer 1B, an environment in which a plurality of devices are connected can be created, and the device connected to the serial bus B3 can be easily and certainly analyzed or investigated.

A second configuration example of the second embodiment of the invention will now be described by referring to FIGS. 19 to 25. In the configuration example, three actual devices of a personal computer 104 having an ID of (n+1) (or a DVD drive 104 having an ID of 2), a hard disk drive 105 having an ID of 1, and the digital camera 102 having an ID of 0 are included, and the bus analyzer 1B simulates the group of other devices. The configuration example is intended for analyzing or investigating responses from the three devices connected on serial buses B4, B5 and B6. It is, however, unnecessary to prepare (n−1) devices having IDS of 2 to n (or (n−2) devices having IDs of 3 to n) for the analysis or investigation. By connecting the bus analyzer 1B and the three devices, an environment for analysis can be created. The bus analyzer 1B interfaces with the IEEE 1394 buses B4, B5 and B6 in the physical layer circuit 2B2 in the bus analyzer 1B, and realizes data communications with the buses B4, B5 and B6. The received data is analyzed by the data analyzing circuit 3 at a post stage. Since the topology is constructed in the interface by assigning a plurality of IDs to the physical layer circuit 2B2 as will be described hereinlater, the environment in which a plurality of devices except for the three actual devices are connected can be created.

The initializing sequence of the IEEE 1394 bus in the second configuration example of the second embodiment in FIG. 19 will be described hereinbelow. Since the tree structure of the topology is determined in conformity with the IEEE 1394 standard, description of the tree-identifying operation of determining the tree structure of the topology is omitted here. A self-identifying operation of assigning IDs to devices will be described. FIG. 20 is a state transition diagram showing the self-identifying operation in the second configuration example of the second embodiment in FIG. 19. FIGS. 21 to 23 show an operation sequence in the case where there is a device having high arbitration (the personal computer 104 having the ID of (n+1) in FIG. 19) except for the bus analyzer 1B. FIGS. 24 and 25 show an operation sequence in the case where the arbitration of the bus analyzer 1B is high.

First, the case where there is the personal computer 104 (ID n+1) as a device having high arbitration except for the bus analyzer 1B will be described with reference to FIGS. 20 to 23. In FIG. 20, after completion of the tree-identifying operation, an idle state (S41 in FIG. 20) in which no signal is outputted from each of the ports is derived. After that, the personal computer 104 as a root in the topology outputs the self_ID_grant signal to its child port. On condition that the self_ID_grant signal is received by the parent port (S42 in FIG. 20 and P41 in FIG. 21), the physical layer circuit 2B2 in the bus analyzer 1B which is not a root outputs a self_ID_grant signal to the child port (lowest_unidentified_childport) to which the digital camera 102 having no ID is connected, and outputs only a data_prefix signal to the other child ports (S43 in FIG. 20 and P41 in FIG. 21).

The digital camera 102 which has received the self_ID_grant signal sets the ID of 0 to itself and outputs a self_ID packet (self_ID packet 0). On condition that the self_ID packet is received by the lowest_unidentified_child port in the physical layer circuit 2B2 (S44 in FIG. 20), the physical layer circuit 2B2 stops outputting the self_ID grant signal and transfers the self_ID packet (self_ID packet 0) from the digital camera 102 to each of the ports (S45 in FIG. 20 and P42 in FIG. 21).

On condition that an ident_done signal from the digital camera 102 is received and child_ID complete is set (S46 in FIG. 20), the physical layer circuit 2B2 receives a speed signal (speed signal 2) from the digital camera 102 and outputs a speed signal (speed signal (.max)) indicative of the maximum data transfer speed of the physical layer circuit 2B2 itself to the same port (S47 in FIG. 20 and P43 in FIG. 21). The state is finished when a timeout of the output of the speed signal occurs (S48 in FIG. 20), and the physical layer circuit 2B2 enters an idle state (S41 in FIG. 20).

When the self_ID_grant signal from the personal computer 104 as a root is received by the parent port (S42 in FIG. 20 and P44 in FIG. 21), the self_ID_grant signal is outputted to the child port (lowest_unidentified_child port) to which the hard disk drive 105 having no ID is connected and a data_prefix signal is outputted to the other child ports (S43 in FIG. 20 and P44 in FIG. 21).

The hard disk drive 105 which has received the self_ID_grant signal sets the ID of 1 to itself and outputs a self_ID packet (self_ID packet 1). On condition that the self_ID packet is received by the lowest_unidentified_child port in the physical layer circuit 2B2 (S44 in FIG. 20), the physical layer circuit 2B2 stops outputting the self_ID grant signal and transfers the self_ID packet (self_ID packet 1) from the hard disk drive 105 to each of the ports (S45 in FIG. 20 and P45 in FIG. 22).

Further, on condition that the ident_done signal from the hard disk drive 105 is received and the child_ID complete is set (S46 in FIG. 20), a speed signal (speed signal 3) from the hard disk drive 105 is received and a speed signal (speed signal (.max)) indicative of a maximum data transfer speed of the physical layer circuit 2B2 is outputted to the same port (S47 in FIG. 20 and P46 in FIG. 22). This state is finished when a timeout of the speed signal output occurs (S48 in FIG. 20) and the physical layer circuit 2B2 enters an idle state (S41 in FIG. 20).

At this time, the setting of IDs to devices to which IDs lower than that of the physical layer circuit 2B2 are given is finished and all the child_ID_complete is set. Consequently, the routine advances to a sequence of assigning IDs to a group of devices to be simulated by the physical layer circuit 2B2. In a manner similar to the foregoing case, when the self_ID_grant signal from the personal computer 104 is received by the parent port (S42 in FIG. 20 and P47 in FIG. 22), since the lowest_unidentified_child port does not exist, without outputting the self_ID_grant signal, a data_prefix signal is outputted to all the child ports (S43 in FIG. 20).

Since all the child_ID complete is set at this time point (S49 in FIG. 20), a self_ID packet (self_ID packet 2) is outputted to all the ports, the ID counter is incremented by one (S50 in FIG. 20 and P47 in FIG. 22) and the ID of 2 is assigned to itself.

The sequence is repeated until the ID counter becomes n (S51 in FIG. 20), and IDs from 3 to n are sequentially set subsequent to the ID of 2 to the physical layer circuit 2B2 (P48 in FIG. 22).

On condition that the ID counter becomes n in the physical layer circuit 2B2 which does not include the root (S52 in FIG. 20), the physical layer circuit 2B2 outputs a speed signal (speed signal (.max)) indicative of the maximum data transfer speed of the physical layer circuit 2B2 together with an ident_done signal to the parent port (S53 in FIG. 20 and P49 in FIG. 23). On condition that the setting of the data transfer speed is finished on receipt of the speed signal (speed signal 1) from the personal computer 104 and the self_ID packet (self_ID packet n+1) from the personal computer 104 is received by the parent port (S54 in FIG. 20 and P49 and P50 in FIG. 23), the self-identifying operation is finished thereby completing the initializing sequence.

The operation of transferring the self_ID packet (self_ID packet n+1) to the child port in P50 in FIG. 23 is performed in normal arbitration.

A case where the physical layer circuit 2B2 in the bus analyzer 1B has high arbitration and includes a root will now be described with reference to FIGS. 20, 24 and 25. After completion of the tree-identifying operation in FIG. 20, an idle state in which there is no signal output from each of the ports is obtained (S41 in FIG. 20). After that, on condition that the physical layer circuit 2B2 includes a root (S42 in FIG. 20), the self_ID_grant signal is outputted to the lowest_unidentified_child port to which the digital camera 102 having no ID is connected and the data_prefix signal is outputted to the other child ports (S43 in FIG. 20).

The digital camera 102 which has received the self_ID_grant signal sets the ID of 0 to itself and outputs a self_ID packet (self_ID packet 0). On condition that the lowest_unidentified_child port in the physical layer circuit 2B2 receives the self_ID packet (S44 in FIG. 20), the physical layer circuit 2B2 stops outputting the self_ID_grant signal and transfers the self_ID packet (self_ID packet 0) from the digital camera 102 to each of the ports (S45 in FIG. 20 and P51 in FIG. 24).

Further, on condition that the ident_done signal from the digital camera 102 is received and child_ID_complete is set (S46 in FIG. 20), the speed signal (speed signal 1) from the digital camera 102 is received, and the speed signal (speed signal (.max)) indicative of the maximum data transfer speed of the physical layer circuit 2B2 is outputted to the same port (S47 in FIG. 20 and P52 in FIG. 24). This state is finished when a timeout of the speed signal output occurs (S48 in FIG. 20), and the physical layer circuit 2B2 enters an idle state (S41 in FIG. 20).

Similar sequences are sequentially repeated, the ID of the hard disk drive 105 is set to 1, and the ID of the DVD 104 is set to 2 (P53 and P54 in FIG. 24 and P55 and P56 in FIG. 25). Then the physical layer circuit 2B2 returns to the idle state (S41 in FIG. 20).

Since setting of IDs to devices to which IDs lower than that of the physical layer circuit 2B2 are given is finished and a state in which all the child_ID_complete is set is obtained, the program progresses to a sequence of assigning IDs to a group of devices simulated by the physical layer circuit 2B2.

On condition that the physical layer circuit 2B2 includes a root (S42 in FIG. 20), the physical layer circuit 2B2 enters the state of S43 in FIG. 20. Since the lowest_unidentified_child port does not exist at this time point, in a state where no self_ID_grant signal is outputted, the data_prefix signal is outputted to all the child ports (S43 in FIG. 20). On condition that all the child_ID_complete has been set (S49 in FIG. 20), the physical layer circuit 2B2 outputs the self_ID packet (self_ID packet 3) to all the ports, increments the ID counter by one (S50 in FIG. 20 and P57 in FIG. 25), and assigns the ID of 3 to itself.

By repeating the sequence until the ID counter becomes n (S51 in FIG. 20), the IDs of 4 to n are sequentially set subsequent to the ID of 3 in the physical layer circuit 2B2 (P58 in FIG. 25).

On condition that the ID counter becomes n in the physical layer circuit 2B2 including a root (S55 in FIG. 20), the self-identifying operation is finished and the initializing sequence is completed.

The state transition from S41 to S45 in association with reception of the self_ID packet by the parent port in FIG. 20 represents the function of performing the self-identifying operation without outputting the self_ID_grant signal. The state transition from S45 to 541 indicates a process of finishing the self_ID packet without receiving the ident_done signal.

As described above, in the second configuration example of the second embodiment of the invention, the three real devices of the personal computer 104 having the ID of (n+1) (or the DVD drive 104 having the ID of 2), the hard disk drive 105 having the ID of 1, and the digital camera 102 having the ID of 0 are included. The group of other devices can interface with the serial buses B4, B5 and B6 in a state where a plurality of IDs are assigned by the physical layer circuit 2B2 in the bus analyzer 1B. It is therefore unnecessary to prepare (n−1) devices having IDs of 2 to n (or (n−2) devices having IDs 3 to n). By connecting the three devices to the bus analyzer 1B, an environment desired to be analyzed can be created. The three devices connected can be therefore easily and certainly analyzed or investigated.

As described above in detail, in the bus analyzer 1A according to the first embodiment, even when the bus analyzer 1A is inserted between the serial buses B1 and B2 of the system to be analyzed, without assigning an ID in the bus initializing sequence after the insertion by the physical layer circuit 2A, a physical interface can be constructed between the buses B1 and B2. Consequently, without changing the topology environment of the system to be analyzed comprising the personal computer 101 and the digital camera 102 connected to the buses B1 and B2 and exerting an influence on the responses on the buses B1 and B2, the bus analyzer 1A as a serial bus interface device can be connected. Since the physical layer circuit 2A of the inserted bus analyzer 1A constructs a physical interface with the buses B1 and B2, data on the buses B1 and B2 can be detected and the states of the buses B1 and B2 can be analyzed or investigated.

Further, as for the bus analyzers 1A1 to 1A6 of the first to six modifications of the first embodiment, the first modification has the data storing circuit 4 for storing data on the serial buses B1 and B2. Consequently, the bus analyzer 1A1 constructs a physical interface with the serial buses B1 and B2 without being given an ID, and can obtain data on the buses B1 and B2 without changing the topology environment of the system to be analyzed and without exerting an influence on operations. The data can be directly analyzed and, moreover, can be properly stored/read to/from the data storing circuit 4 in accordance with a control signal from the data analyzing circuit 31. A series of continuous data or data in a specific sequence can be therefore collected and analyzed, and can be analyzed by comparison with data obtained from the buses B1 and B2. Thus, analysis can be efficiently carried out.

In the second modification, the bus analyzer 1A2 has, in addition to the data storing circuit 4, the data condition detecting circuit 5 and data received by the physical layer circuit 2A2 is monitored. When data matching the predetermined condition is detected, a trigger signal is outputted. Consequently, the received data can be stored in the data storing circuit 4 in response to the output of the trigger signal. By setting the data condition of outputting the trigger signal in a specific data sequence, each time the same sequence is generated, data can be stored. Analysis suitable for the case where a malfunction occurs on a specific condition can be performed.

Further, in the third modification, in addition to the data analyzing circuit 33, the data transfer control circuit 6 is provided. Data to be transmitted can be transferred as it is to the physical layer circuit 2A3 or formed in packets compatible with the protocol on the serial buses B1 and B2 and the packets can be transferred to the physical layer circuit 2A3. Thus, responses on the buses B1 and B2 to a predetermined data packet can be certainly recognized.

In the fourth modification, in addition to the data analyzing circuit 34 and the data transfer control circuit 6, the data storing circuit 4 is provided. Consequently, data to be transmitted can be prestored. The data can be transferred as it is to the physical layer circuit 2A4 or formed in packets compatible with the protocol on the serial buses B1 and B2 and the packets can be transferred to the physical layer circuit 2A4. By storing plural data, a response on the buses B1 and B2 to each data packet can be recognized. By arbitrarily setting a sequence of transmitting a data packet, a response to the specific packet sequence or a response in a state where the communications on the buses B1 and B2 are congested can be recognized.

In the fifth modification, in addition to the data analyzing circuit 35, the data storing circuit 4 and the data transfer control circuit 6, the data transmission condition detecting circuit 7 is provided. The data received by the physical layer circuit 2A5 is monitored and, when data matching the predetermined condition is detected, a trigger signal is outputted. The data to be transmitted which is stored in the data storing circuit 4 can be transferred as it is to the physical layer circuit 2A5 or formed in packets compatible with the protocols on the serial buses B1 and B2 and the packets can be transferred to the physical layer circuit 2A5. By setting the data obtaining condition of outputting the trigger signal in a specific data sequence, each time the same sequence is generated, predetermined data stored in the data storing circuit 4 can be transmitted. Consequently, the same response can be always sent back to the specific data sequence and thus the modification is optimum to recognize the responses on the buses B1 and B2.

In the sixth modification, the bus analyzer 1A6 comprises the pair of ports, the receiving circuit 11, the data converting circuit 10 for converting received data, and the transmitting circuit 12 for forming packets from the transformed data and has a construction in which ports of transmission/reception are switched by the selector 13. On the basis of the analysis of received data by the data bus analyzer 36 or on the basis of data to be transmitted which is stored in the data storing circuit 4, data received by the receiving circuit 11 is converted by the data converting circuit 10, thereby enabling a communication error such as a bit error or a burst error in communications on the serial bus to be simulated. The communication response such as an error correcting function can be therefore recognized.

The bus analyzer 1B according to the second embodiment interfaces with the serial bus B3 in a state where a plurality of IDS are assigned to the physical layer circuit 2B1 and can simulate a group of a plurality of devices. In the case of analyzing or investigating a system in which (n+1) devices having the IDs of 0 to n (or n devices having the IDs 1 to n) are connected to the personal computer 103 having the ID of (n+1) (or the digital camera 103 having the ID of 0), it is unnecessary to prepare (n+1) devices having the IDS 0 to n (or n devices having the IDs 1 to n) and actually construct the system to be analyzed. By connecting the bus analyzer 1B and the personal computer 103 (or the digital camera 103) via the bus B3, the environment of the system to be analyzed can be created, and data is analyzed by the data analyzing circuit 3 at a post stage. Thus, the device to be connected to the bus B3 can be easily and certainly analyzed or investigated.

Further, the bus analyzer 1B can have the construction including the three actual devices of the personal computer 104 having the ID of (n+1) (or the DVD drive 104 having the ID of 2), the hard disk drive 105 having the ID of 1, and the digital camera 102 having the ID of 0. A plurality of IDs can be assigned to the physical layer circuit 2B2 with respect to the group of other devices. The bus analyzer 1B can construct an interface on the serial buses B4, B5 and B6. In this case as well, it is unnecessary to prepare (n−1) devices having the IDS of 2 to n (or (n−2) devices having the IDs 3 to n). By connecting the three actual devices, the environment desired to be analyzed can be created. The connected three devices can be easily and certainly analyzed or investigated.

Obviously, the present invention is not limited to the foregoing embodiments but various improvements and modifications are possible without departing from the gist of the invention.

For example, in the embodiments, the bus analyzer 1B according to the second embodiment can obviously have therein functions similar to those of each of the first to six modifications of the bus analyzer 1A in the first embodiment. In this case, with respect to the mode in which the physical layer circuit has therein the data converting circuit for converting received data, since the bus analyzer 1B according to the second embodiment can have multiple ports, a communication error during communication can be transmitted from an arbitrary port. A response of a device connected to the arbitrary port to an influence of the communication error can be therefore analyzed or investigated.

Although the IEEE 1394 serial bus has been described as an example of the serial bus in the foregoing embodiments, the invention is not limited to the IEEE 1394 serial bus. The invention can be similarly applied to other bus systems capable of automatically assigning an ID to a device to be connected on the bus when the device is inserted or withdrawn.

According to the invention, since an ID is not given to the serial bus interface device to be connected to the serial bus such as the IEEE 1394 serial bus when the serial bus interface device is inserted between devices connected via the serial bus, no influence is exerted on the topology. Since a plurality of IDs can be also assigned, it is unnecessary to prepare all of actual devices to construct a bus system. A bus system can be easily and certainly constructed by simulating some of the devices. The serial bus interface device having the physical layer circuit which is preferably used as a bus analyzer for analyzing and investigating the communicating state of a bus can be provided.

What is claimed is:

1. A serial bus interface device having a function of automatically reconstructing a topology when the device is inserted or withdrawn during operation of a serial bus, comprising a physical layer circuit serving as a physical interface without being given an identification number during the operation of the serial bus after the serial bus interface device is connected to the serial bus.

2. A serial bus interface device according to claim 1, further comprising a data storing unit storing data on the serial bus, which is received by the physical layer circuit.

3. A serial bus interface device according to claim 1, further comprising a control circuit transferring data to be transmitted onto the serial bus via the physical layer circuit to the physical layer circuit.

4. A serial bus interface device according to claim 1, further comprising:
    a pair of communication ports; and
    a converting unit converting data received from the serial bus via the physical circuit,
    wherein data received by one of the pair of communication ports or the converted data is transferred to the other communication port.

5. A serial bus interface device according to claim 1, wherein the serial bus interface device is a bus analyzer analyzing the serial bus.

6. A serial bus interface device according to claim 1, wherein the identification number is not assigned to the physical layer circuit during a self-identifying operation.

7. A serial bus interface device according to claim 1, wherein the physical layer circuit serves as the physical interface without being given an identification number after a self-identifying operation.

8. A serial bus interface device according to claim 2, further comprising a data condition detecting unit monitoring data on the serial bus, which is received by the physical layer circuit and, when data matching a predetermined condition is detected, outputs a trigger signal,
    wherein the data storing unit stores data in response to the output of the trigger signal.

9. A serial bus interface device according to claim 3, further comprising a transmission data storing unit storing data to be transmitted.

10. A serial bus interface device according to claim 9, further comprising a data transmission condition detecting unit monitoring data on the serial bus, which is received by the physical layer circuit and, when data matching a predetermined condition is detected, outputs a trigger signal,
    wherein the control circuit transfers data to be transmitted which is stored in the transmission data storing unit in response to the output of the trigger signal to the physical layer circuit.

11. A serial bus interface device having a function of automatically reconstructing a topology when the device is inserted or withdrawn during operation of a serial bus, comprising a physical layer circuit serving as a physical interface to which a plurality of identification numbers are simultaneously assigned when the serial bus interface device is connected to the serial bus.

12. A serial bus interface device according to claim 11, further comprising a data storing unit storing data on the serial bus, which is received by the physical layer circuit in association with the identification numbers.

13. A serial bus interface device according to claim 11, further comprising a control circuit transferring data to be transmitted onto the serial bus in accordance with at least one of the identification numbers via the physical layer circuit to the physical layer circuit.

14. A serial bus interface device according to claim 11, further comprising:
    a group of communication ports according to the identification numbers; and
    a converting unit converting data received from the serial bus through the physical layer circuit,
    wherein data received by any one of the group of communication ports or the converted data is transferred to at least one of the other communication ports.

15. A serial bus interface device according to claim 12, further comprising:
    a data condition detecting unit monitoring data on the serial bus, which is received by the physical layer circuit in accordance with at least one of the identification numbers and, when data matching a predetermined condition is detected, outputting a trigger signal corresponding to the at least one of the identification numbers,
    wherein data is stored in the data storing unit in association with the at least one of the identification numbers in response to the output of the trigger signal corresponding to the at least one of the identification numbers.

16. A serial bus interface device according to claim 13, further comprising a transmission data storing unit storing data to be transmitted according to the at least one of the identification numbers.

17. A serial bus interface device according to claim 16, further comprising a data transmission condition detecting unit monitoring data on the serial bus, which is received by the physical layer circuit in accordance with the at least one of the identification numbers and, when data matching a predetermined condition is detected, outputting a trigger signal corresponding to the at least one of the identification numbers,
    wherein the control circuit transfers data to be transmitted according to the at least one of the identification numbers stored in the transmission data storing unit in response to the output of the trigger signal corresponding to the at least one of the identification numbers to the physical layer circuit.

18. A serial bus interface device having a function of automatically reconstructing a topology when the device is inserted or withdrawn during operation of a serial bus, comprising a physical layer circuit transmitting and receiving packets without being given an identification number after the serial bus interface device is connected to the serial bus.

19. A serial bus interface device having a function of automatically reconstructing a topology when the device is inserted or withdrawn during operation of a serial bus, comprising a physical layer circuit serving as a physical interface without being given an identification number after a self-identifying operation.

20. A method of simulating a plurality of identification numbers on a serial bus, the method comprising:
    adding a serial bus interface device to the serial bus, wherein the device has a function of automatically reconstructing a topology when the device is inserted or withdrawn during operation of the serial bus, and
    assigning a plurality of identification numbers to a physical interface of the device simultaneously when the device is connected to the serial bus.

* * * * *